United States Patent
Larkin

(10) Patent No.: US 9,497,108 B2
(45) Date of Patent: Nov. 15, 2016

(54) MEDIA SESSIONS

(71) Applicant: Metaswitch Networks Ltd., Enfield (GB)

(72) Inventor: Nicholas Peter Larkin, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 80 days.

(21) Appl. No.: 14/339,321

(22) Filed: Jul. 23, 2014

(65) Prior Publication Data

US 2015/0030016 A1    Jan. 29, 2015

(30) Foreign Application Priority Data

Jul. 23, 2013    (GB) .................................. 1313152.9

(51) Int. Cl.

| H04L 12/66 | (2006.01) |
|---|---|
| H04L 12/707 | (2013.01) |
| H04L 12/741 | (2013.01) |
| H04L 29/06 | (2006.01) |

(52) U.S. Cl.
CPC .............. H04L 45/22 (2013.01); H04L 45/74 (2013.01); H04L 65/104 (2013.01); H04L 65/1006 (2013.01); H04L 65/1069 (2013.01); H04L 65/1073 (2013.01)

(58) Field of Classification Search
CPC ... H04L 45/22; H04L 45/74; H04L 65/1006; H04L 65/1069; H04L 65/1073; H04M 7/0075
USPC .......................................................... 370/352
See application file for complete search history.

(56) References Cited

U.S. PATENT DOCUMENTS

2007/0270164 A1* 11/2007 Maier ................... H04W 64/00
                                                                  455/456.2
2009/0010270 A1*  1/2009 Ejzak ................. H04L 29/12452
                                                                        370/401

(Continued)

FOREIGN PATENT DOCUMENTS

| WO | 2007/103608 A2 | 9/2007 |
|---|---|---|
| WO | 2010/020169 A1 | 2/2010 |

OTHER PUBLICATIONS

UK Search Report dated Jan. 17, 2014 issued from the Intellectual Patent Office in counterpart Application No. GB1313152.9 (3 pages).

*Primary Examiner* — Faisal Choudhury
(74) *Attorney, Agent, or Firm* — EIP US LLP

(57) ABSTRACT

Measures for enabling media bypass of one or more session border controllers (SBCs) in a telecommunications network which includes a plurality of SBCs. An SBC receives an inbound offer message requesting setup of a media session between an originating endpoint device and a terminating endpoint device. The SBC transmits an outbound offer message to an ensuing SBC, wherein the originating endpoint device address comprised in the inbound offer message is re-written with an SBC address in the outbound offer message. The SBC receives an inbound answer message including a terminating endpoint device address. In response to receipt of the inbound answer message, the SBC transmits an outbound answer message to the originating endpoint device without re-writing the terminating endpoint device address, whereby the SBC and the ensuing SBC are bypassed in the media path for the media session.

17 Claims, 14 Drawing Sheets

(56) References Cited

U.S. PATENT DOCUMENTS

2010/0185725 A1* 7/2010 Camarillo ......... H04L 29/06027
    709/203
2012/0243549 A1* 9/2012 Lyons ................. H04L 65/1069
    370/410
2014/0258551 A1* 9/2014 Ye .......................... H04L 67/14
    709/228

* cited by examiner

FIG. 10A

| Address | Device | Address type |
|---|---|---|
| c/m line | Phone 1 | Relayed |
| a line 1 | Phone 1 | Host |
| a line 2 | Phone 1 | Server Reflexive |
| a line 3 | Phone 1 | Relayed |

FIG. 10B

| Address | Device | Address type |
|---|---|---|
| c/m line | SBC 1 | Local SBC |
| a line 1 | Phone 1 | Host |
| a line 2 | Phone 1 | Server Reflexive |
| a line 3 | Phone 1 | Relayed |

FIG. 10C

| Address | Device | Address type |
|---|---|---|
| c/m line | Phone 1 | Relayed |
| a line 1 | Phone 1 | Host |
| a line 2 | Phone 1 | Server Reflexive |
| a line 3 | Phone 1 | Relayed |

FIG. 10D

| Address | Device | Address type |
|---|---|---|
| c/m line | Phone 2 | Relayed |
| a line 1 | Phone 2 | Host |
| a line 2 | Phone 2 | Server Reflexive |
| a line 3 | Phone 2 | Relayed |

MEDIA SESSIONS

CROSS-REFERENCE TO RELATED APPLICATIONS

This application claims priority under 35 U.S.C. §119(a) to GB Patent Application No. 1313152.9, filed on Jul. 23, 2013, the entire content of which is hereby incorporated by reference.

BACKGROUND OF THE INVENTION

1. Field of the Invention

The present disclosure relates to enabling media bypass of one or more session border controllers (SBCs) in a telecommunications network. In particular, but not exclusively, the present disclosure relates to enabling media bypass of one or more SBCs in a telecommunications network which includes a plurality of SBCs via which setup of a media session between endpoint devices can be established.

2. Description of the Related Technology

Packet-based telecommunications networks typically include session border controller (SBC) devices. An SBC is deployed at the border of a Voice Over Internet Protocol (VoIP) network and protects the network by policing media (or 'communication') sessions such as voice calls (or 'VoIP calls') flowing into or out of that network. An SBC may have to relay media data for a media session, for example, either because the media data transits the protected network and needs policing, or because the originating and terminating endpoint devices for the media session cannot send media data to each other directly as they are located in different private networks.

Media sessions such as voice calls are commonly set up using the Session Initiation Protocol (SIP). Media sessions generally involve transfer of media data via a media path and transfer of signaling (or 'control') data via a signaling path. A SIP session involves an offer stage and an answer stage.

The offer stage involves one or more offer messages encapsulated or embedded in one or more SIP signaling messages being transmitted from an originating endpoint device to a terminating endpoint device. Offer messages typically carry a description of the media parameters for the media session, including a network address associated with the originating endpoint device to which media data from the request receiving device should be transmitted. An offer message may for example take the form of a media session setup request, a media session modification request or a media session deletion request. Offer messages frequently traverse a number of SBCs en-route and typical behavior of each SBC device is to re-write a network address contained in the offer message with a local network address before forwarding the offer message.

The answer stage involves one or more answer messages encapsulated or embedded in one or more SIP signaling messages being transmitted in the opposite direction to the offer messages, i.e. from the terminating endpoint device to the originating endpoint device, in order to accept or reject the communication offer. Answer messages typically carry a description of the media parameters for the media session, including a network address associated with the terminating endpoint device to which media data from the answer receiving device should be transmitted. An answer message may for example take the form of a media session setup response, a media session modification response or a media session deletion response. Answer messages frequently traverse a number of SBCs en-route and typical behavior of each SBC device is to re-write a network address contained in the answer message with a local network address before forwarding the answer message.

The term "network address" is used generically in this document to cover both the internet layer address (source and destination IP address) and transport layer address (source and destination port). Interactive Connectivity Establishment (ICE) functionality is an extension to SIP and is described in Request for Comments (RFC) 5245 of the Internet Engineering Task Force (IETF) network working group. It allows the offer messages to carry one or more network addresses associated with the originating endpoint device to which media data from the terminating endpoint can be transmitted. In ICE, the answer messages also carry one or more network addresses associated with the terminating endpoint device to which media data from the originating endpoint can be transmitted. Following receipt of the answer message by the originating endpoint device, the network addresses associated with the originating endpoint device and terminating endpoint device are paired, with each network address associated with the originating endpoint device being paired with each network address associated with the terminating endpoint device. One pair is selected for use in the media session.

The originating endpoint and terminating endpoint will only apply ICE procedures if no other device has interposed itself in the media path. If a device has interposed itself in the media path, the terminating endpoint identifies this, and acts as if ICE functionality was not present. This presents a problem for an SBC processing an ICE offer message because if the SBC follows typical behavior and interposes itself in the media path, then ICE functionality is no longer available for the media session.

It would therefore be desirable to provide improved methods for controlling establishment of media paths for media sessions in a telecommunications network, including in the presence of ICE enabled endpoints.

SUMMARY

According to first embodiments of the present disclosure, there is a method of enabling media bypass of one or more session border controllers (SBCs) in a telecommunications network which includes a plurality of SBCs via which a signaling path for transfer of signaling information for setup of a media session between endpoint devices can be established, the method including, at a SBC: receiving an inbound offer message requesting setup of a media session between an originating endpoint device and a terminating endpoint device in the telecommunications network, the inbound offer message being received along an inbound offer signaling path to the SBC; transmitting an outbound offer message along an outbound offer signaling path from the SBC to an ensuing SBC located between the SBC and the terminating endpoint device in the signaling path for the media session, wherein the originating endpoint device address included in the inbound offer message is re-written with an SBC address in the outbound offer message, the SBC address including a network address associated with the SBC which is capable of being used for the transfer of media data in the media session, the originating endpoint device address including a network address associated with the originating endpoint device which is capable of being used for the transfer of media data in the media session; receiving an inbound answer message along an inbound answer signaling path, the answer message including a terminating endpoint device address, the terminating endpoint device address including a network address associated with the terminating endpoint device and which is capable of being used for the transfer of media data in the media session; and in response to receipt of the inbound answer message, transmitting an outbound answer message to the originating endpoint device without re-writing the terminating endpoint device address, the outbound answer message being transmitted along an outbound answer signaling path to the originating endpoint device, whereby the SBC and the ensuing SBC are bypassed in the media path for the media session.

According to second embodiments of the present disclosure, there is apparatus for use in enabling media bypass of one or more session border controllers (SBCs) in a telecommunications network which includes a plurality of SBCs via which setup of a media session between endpoint devices can be established, the apparatus including at least one processor, and at least one memory including computer program code, the at least one memory and the computer program code being configured to, with the at least one processor, cause an SBC to: receive an inbound offer message requesting setup of a media session between an originating endpoint device and a terminating endpoint device in the telecommunications network, the inbound offer message being received along an inbound offer signaling path to the SBC; transmit an outbound offer message along an outbound offer signaling path from the SBC to an ensuing SBC located between the SBC and the terminating endpoint device in the signaling path, wherein the originating endpoint device address included in the inbound offer message is re-written with an SBC address in the outbound offer message, the SBC address including a network address associated with the SBC and which is capable of being used for the transfer of media data in the media session, the originating endpoint device address including a network address associated with the originating endpoint device which is capable of being used for the transfer of media data in the media session; receive an inbound answer message along an answer signaling path, the answer message including a terminating endpoint device address, the terminating endpoint device address including a network address associated with the terminating endpoint device and which is capable of being used for the transfer of media data in the media session; and in response to receipt of the inbound answer message, transmit an outbound answer message to the originating endpoint device without re-writing the terminating endpoint device address, the outbound answer message being transmitted along an outbound answer signaling path to the originating endpoint device, whereby the SBC and the ensuing SBC are bypassed in the media path for the media session.

According to third embodiments of the present disclosure, there is a computer program product comprising a non-transitory computer-readable storage medium having computer readable instructions stored thereon, the computer readable instructions being executable by a computerized device to cause the computerized device to perform a method of enabling media bypass of one or more session border controllers (SBCs) in a telecommunications network which comprises a plurality of SBCs via which a signaling path for transfer of signaling information for setup of a media session between endpoint devices can be established, the method comprising, at a SBC: receiving an inbound offer message requesting setup of a media session between an originating endpoint device and a terminating endpoint device in the telecommunications network, the inbound offer message being received along an inbound offer signaling path to the SBC; transmitting an outbound offer message along an outbound offer signaling path from the SBC to an ensuing SBC located between the SBC and the terminating endpoint device in the signaling path for the media session, wherein the originating endpoint device address comprised in the inbound offer message is re-written with an SBC address in the outbound offer message, the SBC address comprising a network address associated with the SBC which is capable of being used for the transfer of media data in the media session, the originating endpoint device address comprising a network address associated with the originating endpoint device which is capable of being used for the transfer of media data in the media session; receiving an inbound answer message along an inbound answer signaling path, the answer message comprising a terminating endpoint device address, the terminating endpoint device address comprising a network address associated with the terminating endpoint device and which is capable of being used for the transfer of media data in the media session; and in response to receipt of the inbound answer message, transmitting an outbound answer message to the originating endpoint device without re-writing the terminating endpoint device address, the outbound answer message being transmitted along an outbound answer signaling path to the originating endpoint device, whereby the SBC and the ensuing SBC are bypassed in the media path for the media session.

According to fourth embodiments of the present disclosure, there is a method of enabling media bypass of one or more session border controllers (SBCs) in a telecommunications network which includes a plurality of SBCs via which a signaling path for transfer of signaling information for setup of a media session between endpoint devices can be established, the method including, at an SBC: receiving an inbound offer message requesting setup of a media session between an originating endpoint device and a terminating endpoint device in the telecommunications network, the inbound offer message being received along an inbound offer signaling path to the SBC; and transmitting an outbound offer message along an outbound offer signaling path from the SBC to the terminating endpoint device, wherein a preceding SBC address included in the inbound offer message is re-written with an originating endpoint device address in the outbound offer message, the preceding SBC address including a network address associated with a preceding SBC located between the originating endpoint device and the SBC in the signaling path for the media session which is capable of being used for the transfer of media data in the media session, the originating endpoint device address including a network address associated with the originating endpoint device which is capable of being used for the transfer of media data in the media session.

According to fifth embodiments of the present disclosure, there is a system for enabling media bypass of one or more session border controllers (SBCs) in a telecommunications network which comprises a plurality of SBCs via which a signaling path for transfer of signaling information for setup of a media session between endpoint devices can be established, the system comprising at least a first processor, and at least a first memory including first computer program code, the at least first memory and the first computer program code being configured to, with the at least first processor, cause a first SBC to: receive an inbound offer message requesting setup of a media session between an originating endpoint device and a terminating endpoint device in the telecommunications network, the inbound offer message being received along an inbound offer signaling path to the first SBC; and transmit an outbound offer message along an outbound offer signaling path from the first SBC to a second SBC located between the first SBC and the terminating endpoint device in the signaling path, wherein the originating endpoint device address comprised in the inbound offer message is re-written with a SBC address in the outbound offer message, the SBC address comprising a network address associated with the first SBC and which is capable of being used for the transfer of media data in the media session, the originating endpoint device address comprising a network address associated with the originating endpoint device which is capable of being used for the transfer of media data in the media session; the system comprising at least a second processor, and at least a second memory including second computer program code, the at least second memory and the second computer program code being configured to, with the at least second processor, cause a second SBC to: receive an inbound offer message requesting setup of a media session between an originating endpoint device and a terminating endpoint device in the telecommunications network, the inbound offer message being received along an inbound offer signaling path to the second SBC; and transmit an outbound offer message along an outbound offer signaling path from the second SBC to the terminating endpoint device, wherein the first SBC address comprised in the inbound offer message is re-written with an originating endpoint device address in the outbound offer message, the first SBC address comprising a network address associated with the first SBC located between the originating endpoint device and the second SBC in the signaling path, which is capable of being used for the transfer of media data in the media session, the originating endpoint device address comprising a network address associated with the originating endpoint device which is capable of being used for the transfer of media data in the media session; receive an inbound answer message from the terminating endpoint device comprising a terminating endpoint device address, the terminating endpoint device address comprising a network address associated with the terminating endpoint device which is capable of being used for the transfer of media data in the media session, the inbound answer message being received along an inbound answer signaling path to the second SBC; and in response to receipt of the inbound answer message, transmit an outbound answer message to the first SBC without re-writing the terminating endpoint device address, the outbound answer message being transmitted along an outbound answer signaling path to the first SBC, the at least first memory and the first computer program code being configured to, with the at least first processor, cause the first SBC to: receive an inbound answer message along an inbound answer signaling path, the answer message comprising a terminating endpoint device address, the terminating endpoint device address comprising a network address associated with the terminating endpoint device and which is capable of being used for the transfer of media data in the media session; and in response to receipt of the inbound answer message, transmit an outbound answer message to the originating endpoint device without re-writing the terminating endpoint device address, the outbound answer message being transmitted along an outbound answer signaling path to the originating endpoint device, whereby the first SBC and the second SBC are bypassed in the media path for the media session.

Further features will become apparent from the following description of embodiments, given by way of example only, which is made with reference to the accompanying drawings.

BRIEF DESCRIPTION OF THE DRAWINGS

FIGS. 10A, 10B, 10C, and 10D depict several media bypass data stacks according to one or more embodiments of the present disclosure;

DETAILED DESCRIPTION OF CERTAIN INVENTIVE EMBODIMENTS

Figure 1:
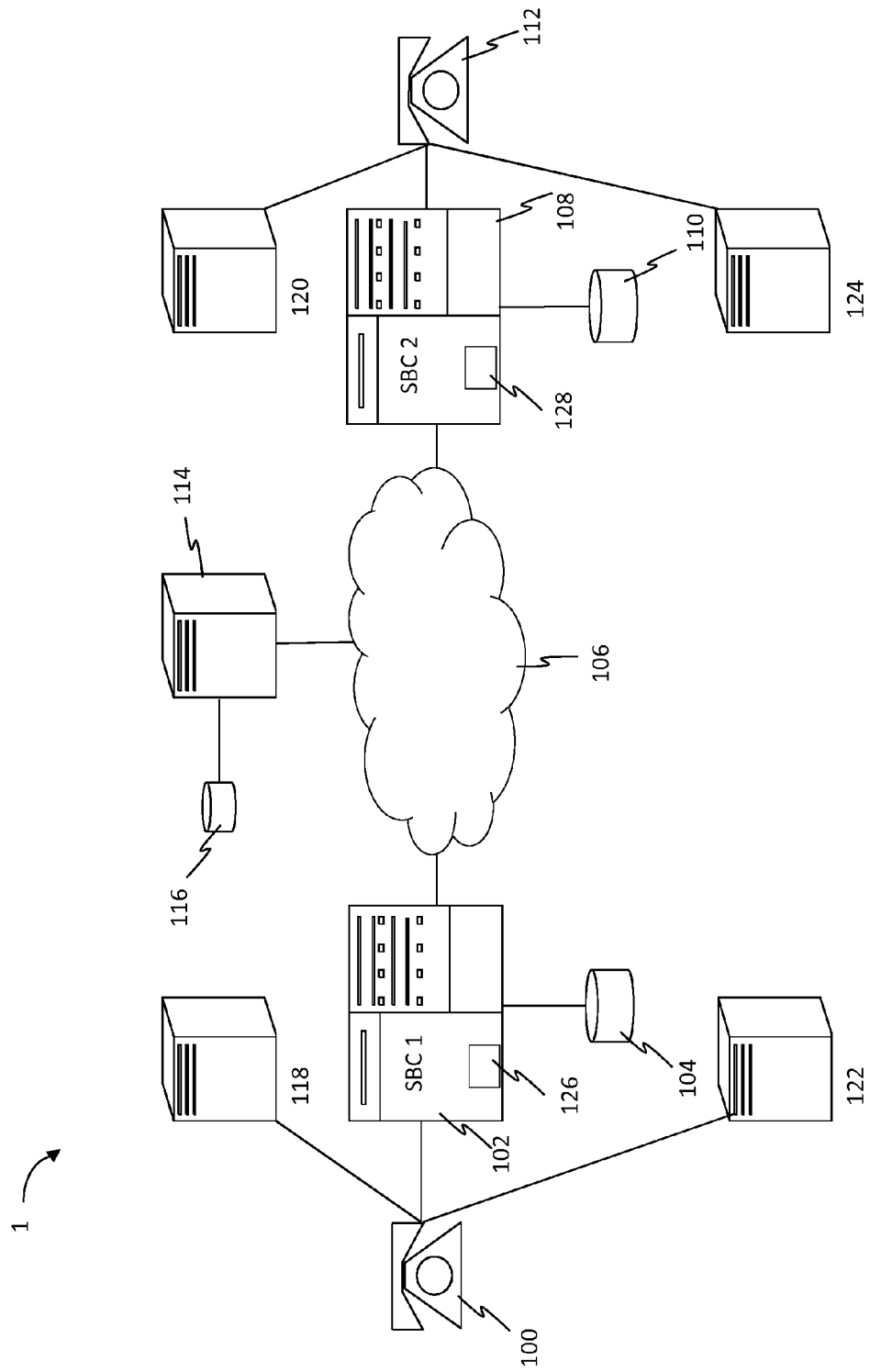
FIG. 1 is a system diagram according to one or more embodiments of the present disclosure.

FIG. 1 is a system diagram according to embodiments of the present disclosure. FIG. 1 illustrates an example telecommunications network 1 (such as an IP network) that includes a plurality of endpoint devices 100, 112 and a plurality of SBCs 102, 108. Telecommunications network 1 may contain more endpoint devices SBCs and one or more network address translators (NATs) (not shown). In the embodiments of FIG. 1, SBCs 102 and 108 include SBCs, therefore they typically relay media data for a media session (or 'communication' session), for example, either because the media data transits the protected network and needs policing, or because the originating and terminating endpoint devices for the media session cannot send media data to each other directly as they are located in different private networks. A private network, such as an enterprise voice over internet packet (VoIP) network, is a network that uses private IP addresses.

Endpoint device 100 is connected to SBC 102 (denoted as 'SBC 1') which is in turn connected to network 106. Network 106 may include one or more packet-switched networks such as the Internet or carrier-owned VoIP networks. Endpoint device 112 is connected to SBC 108 (denoted as 'SBC 2') which is in turn connected to network 106. SBCs 102 and 108 have access to databases 104 and 110 respectively. SIP Registrar 114 is a server connected to network 106 which provides a location service allowing registration of Internet Protocol (IP) addresses against SIP Uniform Resource Identifiers (URIs) for SIP devices and processing of SIP device location queries. SIP Registrar 114 keeps a record of registered devices in registration database 116.

Endpoint devices 100, 112 and SBCs 102, 108 are capable of conducting communications sessions where signaling procedures are used to setup and control the sessions and media processing procedures are used to transfer media data during the sessions. Each endpoint device 100, 112 could for example include a VoIP telephone, or a computing device such as a personal computer configured to conduct communications sessions. Each SBC 102, 108 could, for example, alternatively take the form of a computer server that includes hardware and/or software implementing a SIP proxy server, a Softswitch, or other forms of SBC. An originating and terminating endpoint device pair 100, 112 may carry out a media session such as a voice call via one or more SBCs 102, 108.

A SBC will typically (but not necessarily always) be located on the boundary between two different domains or parts of a network (such as telecommunications network 1) for example on the boundary between a private LAN and the Internet or access network, with the SBC being responsible for policing media sessions in and out of the private LAN.

In the embodiments of FIG. 1, endpoint device 100 is connected to a STUN server 118 and a TURN server 122. In the embodiments of FIG. 1, endpoint device 112 is connected to a STUN server 120 and a TURN server 124.

A STUN server is capable of providing a network address to an endpoint device in response to a request from the endpoint device. The network address provided by the STUN server is a 'server reflexive' address and represents a network address of the endpoint device address as seen by the network.

A TURN server is capable of providing a network address to the endpoint device in response to a request from the endpoint device. The network address provided by the TURN server is a 'relayed' address assigned to the endpoint device by the TURN server.

The term "network address" is used generically in this document to cover both the internet layer address (source and destination IP address) and transport layer address (source and destination port).

In an embodiment, a STUN server may provide both endpoint devices with server reflexive addresses and a TURN server may provide both endpoint devices with a relayed addresses. One or more of the aspects of the embodiments described herein with reference to the drawings include processes performed by SBC 1 and SBC 2. In embodiments, SBC 1 and SBC 2 include processing systems and/or one or more processors 126 and 128 configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

Figure 2:
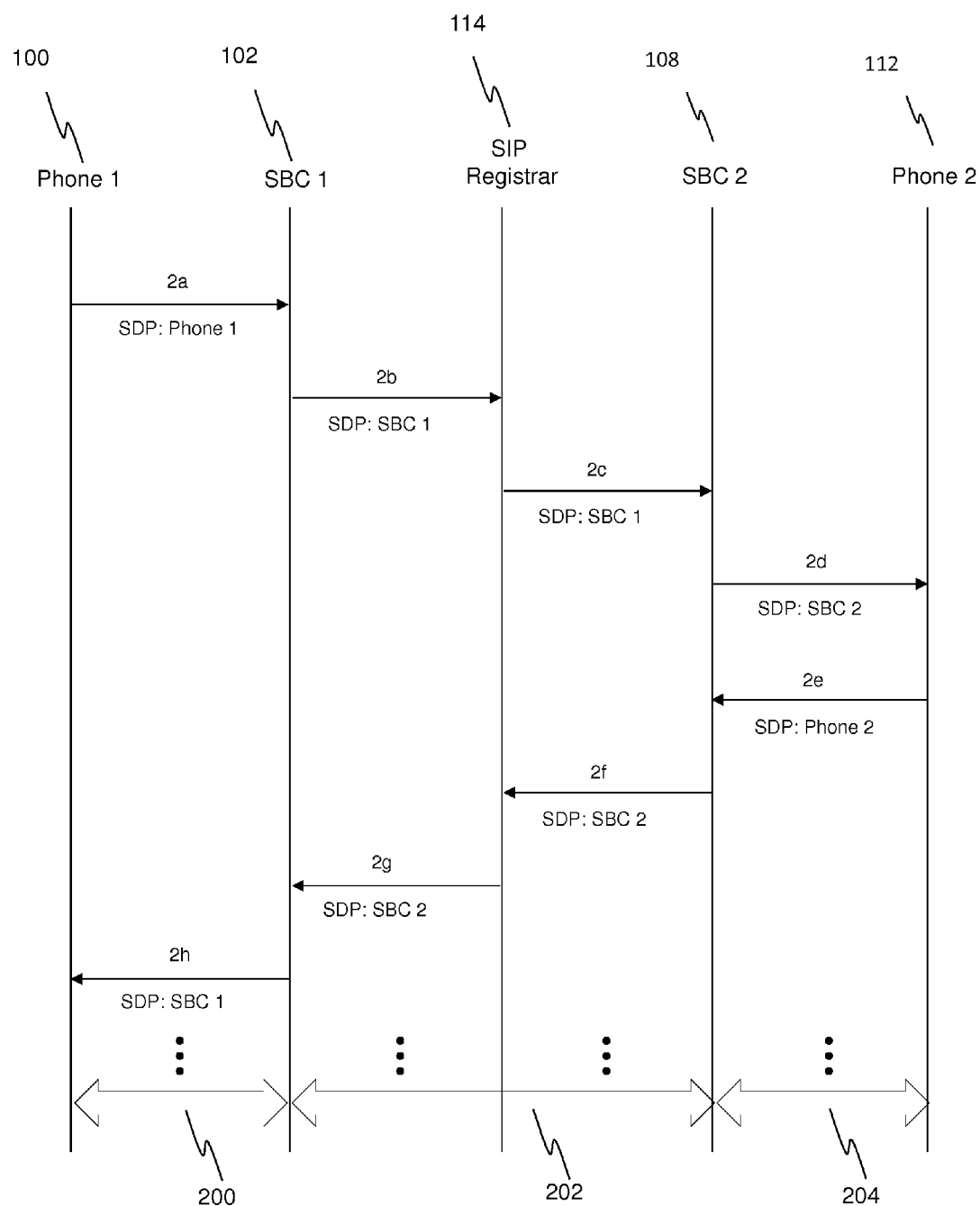
FIG. 2 is a message flow diagram depicting control of a media session according to the prior art.

FIG. 2 is a message flow diagram depicting control of a media session according to the prior art. The embodiments of FIG. 2 can for example be implemented in a system as depicted in FIG. 1.

The user of originating endpoint device 100 (denoted herein as 'Phone 1') wishes to conduct a media session with the user of terminating endpoint device 112 (denoted herein as 'Phone 2'). Initiation of the media session begins with appropriate input on Phone 1 (for example, the user "dialing" the appropriate phone number), for example selection of the user of Phone 2 from an address book stored on Phone 1. Phone 1 is configured to contact SBC 1 with all offer messages. Phone 1 therefore transmits an offer message in the form of a SIP INVITE signaling message to SBC 1 in step 2a, for example addressed to phone2@largeent.net. The INVITE message of step 2a typically contains Session Description Protocol (SDP) data for Phone 1, i.e. a network address associated with Phone 1 is given as an address for transmittal of media data during the media session. The SDP data provides a standard representation for describing media session initialization parameters. It is utilized in SIP to provide a format for encoding network addresses that may be used in a media session. The INVITE message of step 2a is received by SBC 1 along an inbound signaling path from Phone 1 to Phone 2.

SBC 1 forwards the INVITE message along an outbound signaling path for an offer message according to its routing rules to SIP registrar 114 in step 2b. SBC 1 alters the SDP data for the INVITE message of step 2b to refer to a network address associated with SBC 1, i.e. an address associated with SBC 1 is given as an address for transmittal of media data during the media session.

SIP registrar 114 looks up phone2@largeent.net in registration database 116, resulting in the media session being directed using an INVITE message, for example addressed to SBC-contact2@SBC2.largeent.net, in step 2c to the SBC for Phone 2 which in this case is SBC 2. SIP registrar 114 does not change the SDP data in the INVITE message of step 2c.

SBC 2 identifies that setup of a media session with Phone 2 is being requested, so directs the media session to Phone 2 by sending an INVITE message along an outbound signaling path to Phone 2, for example addressed to contact2@ipaddress_phone 2, in step 2d. SBC 2 alters the SDP data for the INVITE message of step 2d to refer to a network address associated with SBC 2, i.e. an address associated with SBC 2 is given as an address for transmittal of media data during the media session.

Phone 2 responds to the INVITE of step 2d offering communication with Phone 1 via SBC 2 with a response message typically in the form of a SIP 200 OK signaling message in step 2e. The 200 OK message of step 2e contains SDP data for Phone 2, i.e. an address associated with Phone 2 is given as an address for transmittal of media data during the media session. SBC 2 receives the answer message along an inbound signaling path from Phone 2 to Phone 1.

SBC 2 forwards the response message of step 2e along an outbound signaling path from Phone 2 to Phone 1 to SIP registrar 114 in the form of a SIP 200 OK message in step 2f. SBC 2 alters the SDP data for the 200 OK message of step 2f to refer to a network address associated with SBC 2, i.e. an address associated with SBC 2 is given as an address for transmittal of media data during the media session.

SIP registrar 114 forwards the response message of step 2f on to SBC 1 in the form of a SIP 200 OK message in step 2g. SIP registrar 114 does not alter the SDP data.

SBC 1 forwards the response message of step 2g to Phone 1 along an outbound signaling path from Phone 2 to Phone 1 in the form of a SIP 200 OK message in step 2h. SBC 1 alters the SDP data for the 200 OK message of step 2h to refer to a network address associated with SBC 1, i.e. an address associated with SBC 1 is given as an address for transmittal of media data during the media session.

Media data then flows between Phone 1 and Phone 2 passing via both SBC 1 and SBC 2, i.e. media data flowing from Phone 1 is relayed first via SBC 1 and then via SBC 2 and on to Phone 2. Similarly, media data flowing from Phone 2 is relayed first via SBC 2 and then via SBC 1 and on to Phone 1.

In this prior art example, the signaling path for the media session includes Phone 1, SBC 1, SBC 2 and Phone 2. The media path for the media session also includes Phone 1, SBC 1, SBC 2 and Phone 2.

Note that in the above embodiments SIP Registrar may not be included as the INVITE message may be sent directly from SBC1 to SBC2 along an outbound signaling path.

Transfer of other signaling messages (not shown), such as SIP ACK (Acknowledge) messages may be transmitted between Phone 1, SBC 1, SIP registrar 114, SBC 2, and Phone 2 before media data begins to flow during the media session.

In the above prior art case, where an offer message is forwarded on by one or more SBCs in the signaling path for the media session in order to reach a terminating endpoint device, each SBC will re-write the SDP so that its address is set up in the SDP as an address to which media data for the media session is to be transmitted. Accordingly, the terminating endpoint device will transmit its media data to the last SBC in the signaling path, which will send the media data through the chain of SBCs in the signaling path until finally the last SBC in the signaling path relays the media data to the originating endpoint device.

Embodiments of the disclosure described below provide improved methods for controlling establishment of the media path for media sessions in a telecommunications network.

Interactive Connectivity Establishment (ICE) functionality is an extension of SIP and allows the originating endpoint and the terminating endpoint to each offer more than one network address for the transfer of media data in a media session. ICE functionality can only be used if no media device has interposed itself in the media path. NATs are typically deployed at the border of a Voice over Internet Protocol (VoIP) network and protect the network by providing an interface between a private network and a public network that maps private network addresses to public network addresses maintaining the privacy of the private network addresses. Whereas an SBC will re-write a network address included in offer or answer message with a network address associated with the SBC, NATs do not alter such network addresses included in offer and answer message. Therefore, ICE functionality would be compatible with the system shown in FIG. 1 if SBC1 102 and SBC 2 108 were Network Address Translators (NATs), rather than SBCs.

Figure 3:
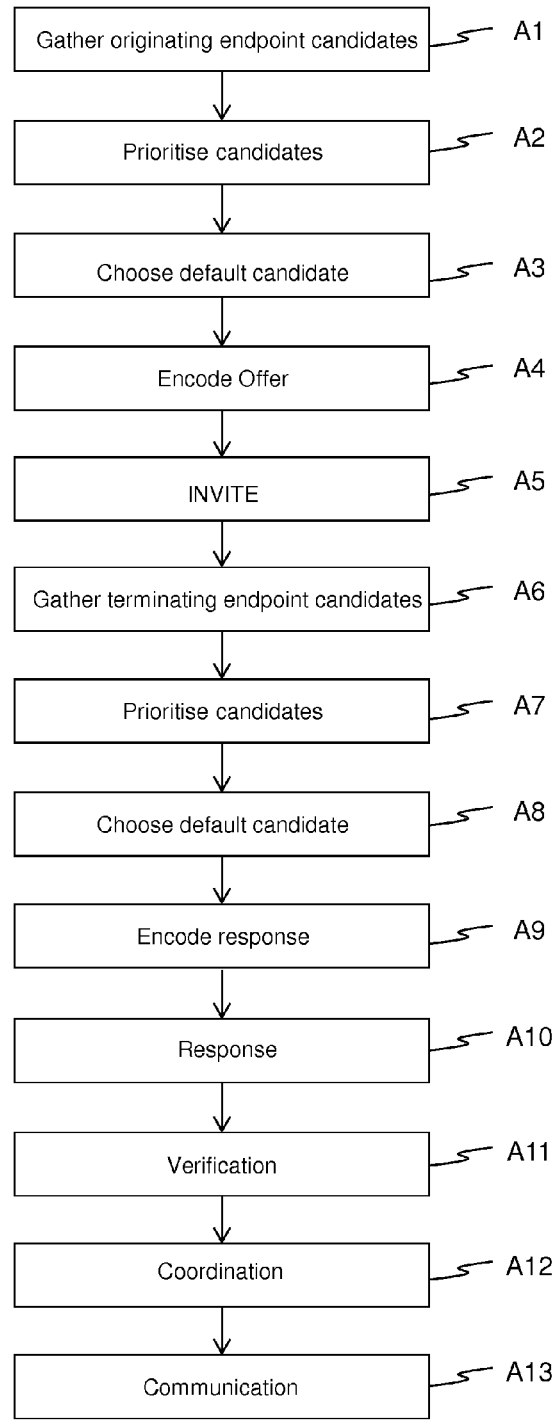
FIG. 3 is a flow chart depicting Interactive Connectivity Establishment (ICE) protocol according to the prior art.

FIG. 3 is a flow chart of the setup of a media session using ICE functionality. The user of an originating endpoint 100 (denoted 'Phone 1') wishes to conduct a media session with the user of a terminating endpoint 112 (denoted 'Phone 2'). Initiation of the media session begins with appropriate input on Phone 1, for example selection of the user of Phone 2 from an address book stored on Phone 1. Phone 1 gathers (or 'compiles a list of') its candidate network addresses in step A1. Candidate network addresses are IP addresses, which are unique numbers that identify entities in a network. Each entity may have more than one network address associated with it.

There are three types of candidate network addresses available:

A first type of candidate network address is a host address. Host addresses are obtained by binding to ports on an IP address attached to an interface on the host.

A second type of candidate network address available is a server reflexive candidate. This is an address provided by a STUN server 118 and the address seen by devices outside of the network that Phone 1 resides in. Phone 1 obtains its server reflexive address by making a STUN request to the STUN server, and receiving a STUN response with the server reflexive address.

A third type of candidate network address available is a relayed address. This is an address provided by a TURN server 122. Phone 1 obtains a relayed address by making a TURN request to the TURN server, which then allocates a relayed address to Phone 1 in response to the request. The TURN server then transmits the allocated address to Phone 1. A media session that uses a relayed address will necessarily include the TURN server in its media path. The candidate network addresses gathered in may be specific to the media session, i.e. only valid for the media session being established.

Once Phone 1 has gathered the candidate network addresses that may be used in the media session, a step of assigning a priority to the candidate network addresses is carried out in A2.

For ICE, each candidate network address for a media session should have a unique priority that is a positive integer. ICE requires that a preference is defined for each type of candidate (host, server reflexive, relayed), and, when the endpoint device is multihomed (i.e. the endpoint device has multiple host network addresses) choosing a preference for its IP address. These two preferences are combined to compute a priority for a candidate network address.

Following the step of assigning a priority to the candidate network addresses, a default network address is selected in step A3. The default network address is selected from the gathered candidate network addresses and is the network address that has the most likely chance of success for establishing the media session. The default network address is typically a relayed address.

The candidate network addresses are encoded in an offer message in the form of SDP data in a SIP INVITE in step A4.

The SDP data is made up of multiple fields; the default network address is presented in a first standard field of the SDP data, and the candidate network addresses (referred to as alternative network addresses) are presented in a second field of the SDP data.

In embodiments, the first field of the SDP data includes a c-line/m-line, which include information related to the default network address. In embodiments, the second field of the SDP data includes an a-line, which includes information related to the alternative network addresses. Phone 1 sends the SIP INVITE along an outbound signaling path to the terminating endpoint in step A5, in this example, Phone 1 is configured to send all SIP INVITE messages to NAT 1.

NAT 1 forwards the INVITE message along an outbound signaling path according to its routing rules to SIP registrar 114 without altering the SDP data.

SIP registrar 114 looks up phone2@largeent.net in registration database 216, resulting in the media session being directed using an INVITE message, for example addressed to SBC-contact2@SBC2.largeent.net, to the registered SIP back-to-back user agent for Phone 2 which in this case is NAT 2. SIP registrar 114 does not change the SDP data in the INVITE message.

NAT 2 identifies that setup of a media session with Phone 2 is being requested, so directs the media session to Phone 2 by sending an INVITE message along an outbound signaling path to Phone 2, for example addressed to contact2@ipaddress_phone 2 without altering the SDP data.

In response to receiving the SIP INVITE, Phone 2 gathers its candidate network addresses in step A6, which are capable of being used for the transfer of media data in a media session. The candidate network addresses may include host addresses; server reflexive addresses obtained from a STUN server 120, and/or relayed addresses obtained from a TURN server 124.

Phone 2 assigns a priority to the candidate network addresses in step A7, chooses the default network address in step A8 using similar procedures as for Phone 1 for steps A2 and A3 respectively.

The candidate network addresses are encoded in an answer message in the form of SDP data of a SIP 200 OK signaling message in step A9. The response is made up of multiple fields; the default network address is presented in a first standard field of the response, and the candidate network addresses, referred to as alternative network addresses are presented in a second field of the response.

Phone 2 transmits the response to NAT 2 in step A10. NAT 2 forwards the response message along an outbound signaling path to SIP registrar 114 without altering the SDP data.

SIP registrar 114 forwards the response message on to NAT 1. SIP registrar 114 does not alter the SDP data.

NAT 1 forwards the response message along an outbound signaling path to Phone 1 without altering the SDP data.

Each endpoint pairs up its candidate network addresses with those of the other endpoint to form candidate pairs, a candidate network address of one endpoint is paired with every candidate network address of the other endpoint. The candidate pairs are assigned a priority based on the same principals used to assign priority to the candidate network addresses. A verification of each candidate pair is performed in step A11. A connectivity check is performed between each candidate pair, starting with the candidate pair with the highest priority. The connectivity check consists of a first endpoint transmitting a connectivity test message to the second endpoint. In response to a successful receipt of a connectivity test message, the second endpoint transmits a response message back to the first endpoint. A successful candidate pair is established if a response from the second endpoint is received at the first endpoint.

Following the verification of potential candidate pairs, each endpoint selects the same candidate pair for use in the media session as in step A12. To do this, one endpoint acts as a controlling endpoint, and the other as a passive endpoint. The controlling endpoint transmits a message to the passive endpoint with an offer of a candidate pair for use in the media session to the passive endpoint. The offered candidate pair is based on the prioritization of the candidate pairs.

Once both the originating endpoint and terminating endpoint have agreed upon the candidate pair for use, the media session can be established as in step A13.

Figure 4:
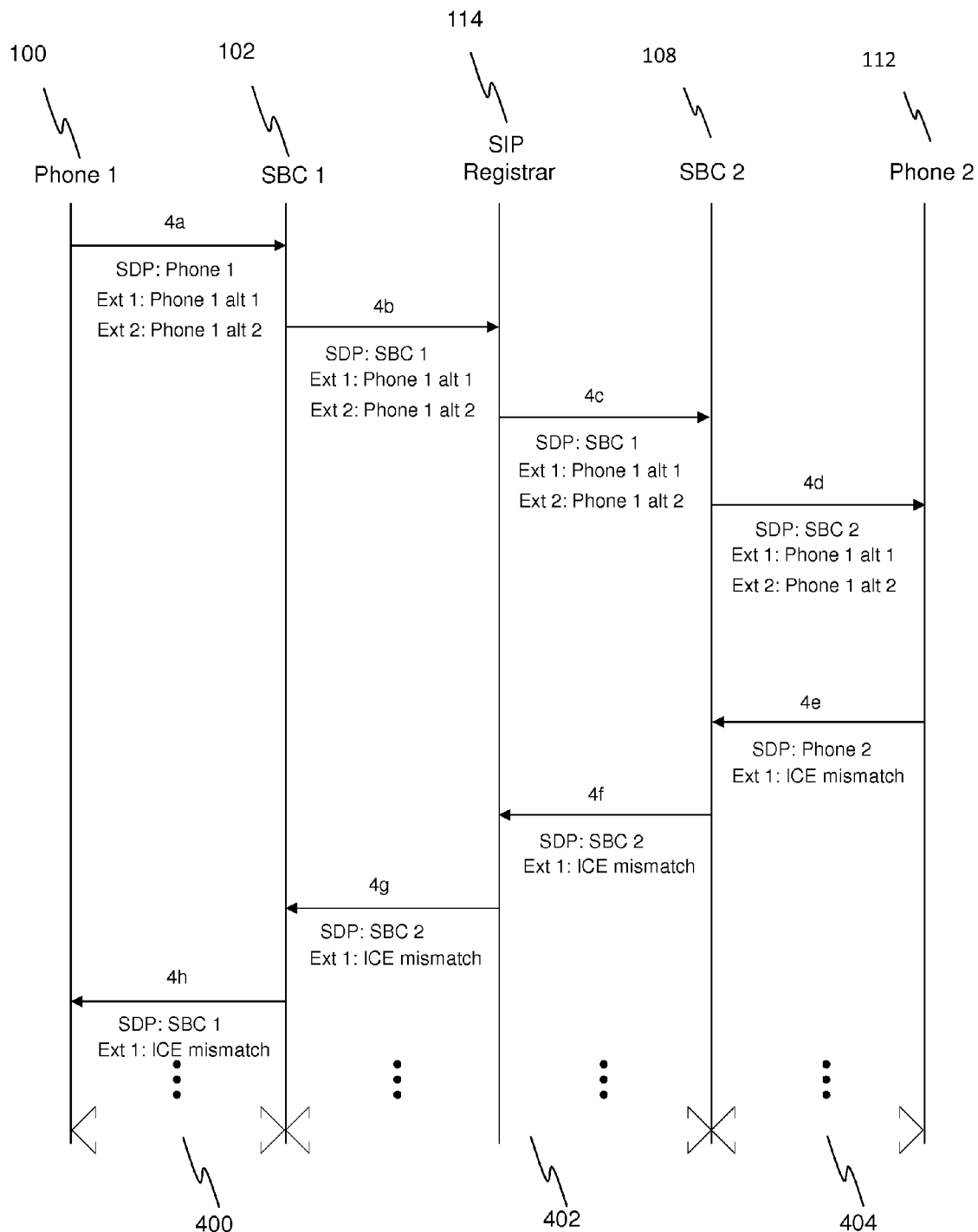
FIG. 4 is a message flow diagram depicting control of a media session according to the prior art.

FIG. 4 is a message flow diagram depicting control of a media session according to the prior art, in which Phone 1 and Phone 2 are capable of using ICE functionality (i.e. Phones 1 and 2 'support ICE protocols' or 'are ICE aware'). The embodiments of FIG. 4 can for example be implemented in a system as depicted in FIG. 1.

The user of Phone 1 wishes to conduct a media session with the user of Phone 2. Initiation of the media session begins with appropriate input on Phone 1, for example selection of the user of Phone 2 from an address book stored on Phone 1.

Phone 1 carries out steps A1, A2, A3 and A4 as described above in relation to FIG. 3, wherein Phone 1 follows ICE procedures and gathers a list of candidate network addresses that can be used for the transfer of media data in a media session. The candidate network addresses may include host addresses, server reflexive addresses and relayed addresses. The candidate network addresses are ordered in terms of priority for use in the media session and a default network address for Phone 1 is selected from the gathered candidate network addresses. The default network address is encoded into a first standard field of the SIP INVITE and the candidate network addresses are encoded into a second standard field of the SIP INVITE, and are further referred to as alternative network addresses.

Phone 1 is configured to contact SBC 1 with media session requests. Phone 1 transmits an offer message typically in the form of an SIP INVITE signaling message to SBC 1 in step 4a for example addressed to phone2@largeent.net. In this example, for clarity purposes, only a default network address and two alternative network addresses are shown, but in practice there may be more or less than two alternative network addresses.

SBC 1 forwards the INVITE message according to its routing rules to SIP registrar 114 in step 4b. SBC 1 alters the default network address for the INVITE message of step 4b to refer to an address associated with SBC 1, i.e. an address associated with SBC 1 is given as an address for transmittal of media data during the media session. The alternative network addresses are not altered by SBC 1.

SIP registrar 114 looks up phone2 @largeent.net in registration database 116, resulting in the media session being directed using an INVITE message, for example addressed to SBC-contact2@SBC2.largeent.net, in step 4c to the registered SIP back-to-back user agent for Phone 2 which in this case is SBC 2. SIP registrar 114 does not change the SDP data in the INVITE message of step 4c.

SBC 2 identifies that setup of a media session with Phone 2 is being requested, so directs the media session to Phone 2 by sending an INVITE message to Phone 2, for example addressed to contact2@ipaddress_phone 2, in step 4d. SBC 2 alters the default network address of the INVITE message of step 4d to refer to an address associated with SBC 2, i.e. an address associated with SBC 2 is given as an address for transmittal of media data during the media session. The alternative candidate network addresses are not altered by SBC 2.

Phone 2 determines if the default network address in the SDP data of the INVITE matches any of the alternative network addresses found in the second field of the SDP data of the INVITE in accordance with RFC5245. In this example, the default network address is a network address associated with SBC 2, whereas the alternative network addresses are network addresses associated with Phone 1.

As the default network address of the INVITE does not match any of the alternative network addresses, the second field of the answer message is set as a=ice-mismatch, indicating that ICE protocols cannot be used for this media session.

Phone 2 responds to the INVITE of step 4d offering communication with Phone 1 via SBC 2 with a valid answer message typically in the form of a SIP 200 OK signaling message in step 4e. The 200 OK message of step 4e contains SDP data for Phone 2, i.e. an address associated with Phone 2 is given as an address for transmittal of media data during the media session.

Steps 4e, 4f, 4g and 4h are similar to those of 2e, 2f, 2g and 2h described above in relation to FIG. 2, with the addition of the a=field being set to a=ice-mismatch in the second field of the response messages.

Media data then flows between Phone 1 and Phone 2 passing via both SBC 1 and SBC 2, i.e. media data flowing from Phone 1 is relayed first via SBC 1 and then via SBC 2 and on to Phone 2. Similarly, media data flowing from Phone 2 is relayed first via SBC 2 and then via SBC 1 and on to Phone 1.

In this example of prior art, the signaling path for the media session includes Phone 1, SBC 1, SBC 2 and Phone 2. The media path for the media session also includes Phone 1, SBC 1, SBC 2 and Phone 2.

Transfer of other signaling messages (not shown), such as SIP ACK messages may be transmitted between Phone 1, SBC 1, SIP registrar 114, SBC 2, and Phone 2 before media data begins to flow during the media session.

In the prior art case of FIG. 4 where an offer message is directed on by one or more SBCs in the signaling path for the media session in order to reach a terminating endpoint device, each SBC will re-write the default network address in the first field of the SDP so that its address is set up in the first field of the SDP as an address to which media data for the media session is to be transmitted. Accordingly, the terminating endpoint device will transmit its media data to the last SBC in the signaling path, which will send the media data through the chain of SBCs in the signaling path until finally the last SBC in the signaling path relays the media data to the originating endpoint device.

In the embodiments of FIG. 4, Phones 1 and 2, which are both ICE aware are unable to utilize ICE procedures for establishing a media session.

Figure 5:
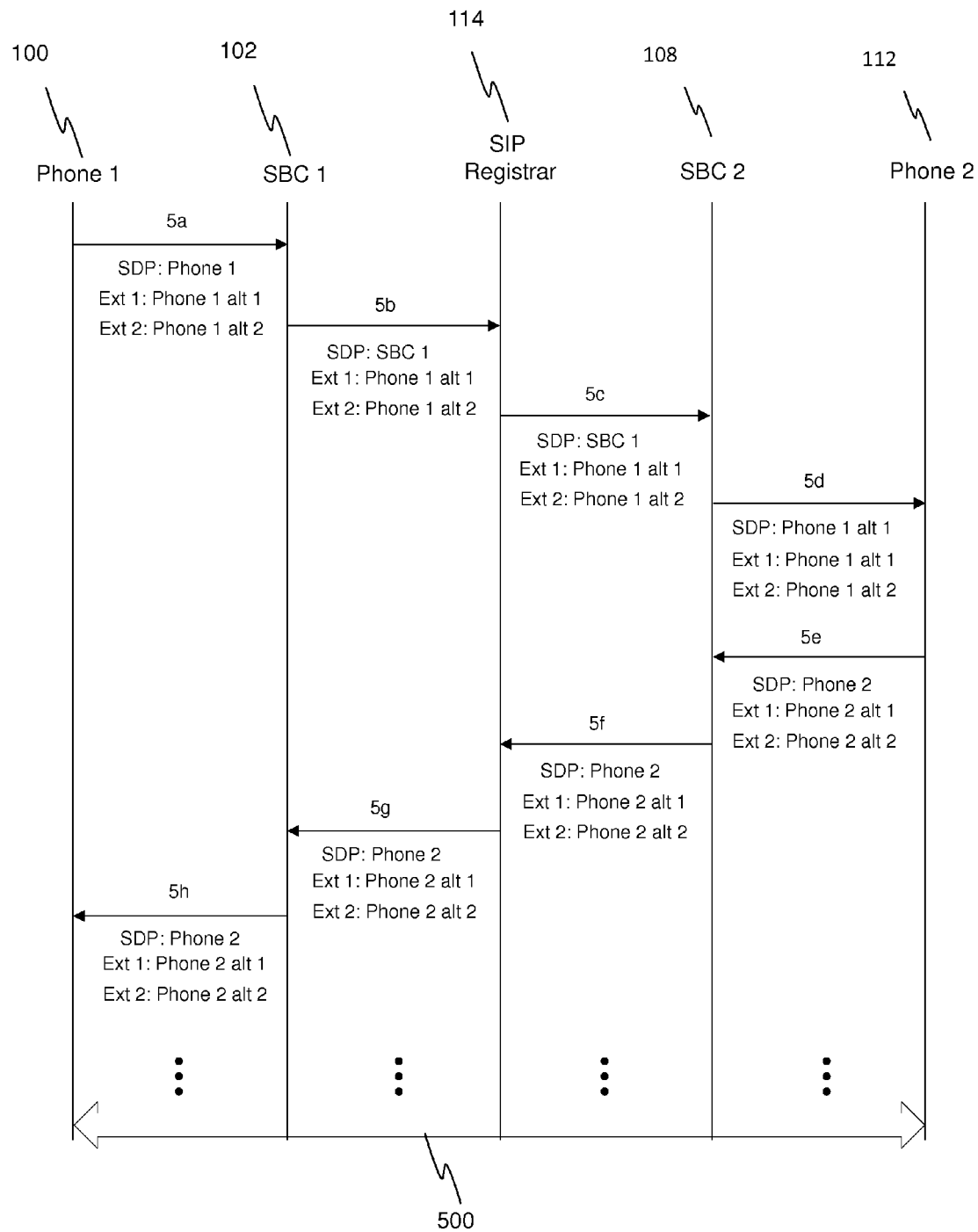
FIG. 5 is a message flow diagram depicting control of a media session according to one or more embodiments of the present disclosure.

FIG. 5 is a message flow diagram depicting control of a media session according to embodiments of the disclosure, in which Phone 1 and Phone 2 support ICE functionality. The embodiments of FIG. 5 can for example be implemented in a system as depicted in FIG. 1.

The user of Phone 1 wishes to conduct a media session with the user of Phone 2. Steps 5a, 5b and 5c, are similar to steps 4a, 4b and 4c described above in relation to FIG. 4.

In step 5c, SBC 2 receives an inbound offer message in the form of an SIP INVITE requesting setup of a media session between the originating endpoint device (Phone 1 in FIG. 5) and the terminating endpoint device (Phone 2 in FIG. 5).

SBC 2 determines that Phone 2 supports media bypass functionality where one or more SBCs can be bypassed in the media path for the media session. According to embodiments of the disclosure, the determination includes determining that Phone 2 has at least first and second associated network addresses which are capable of being used for the transfer of media data in the media session.

In embodiments, the determination includes determining that Phone 2 supports ICE. SBC 2 may for example have stored connectivity data of Phone 2 locally in relation to a previous media session. The locally stored media bypass functionality data may include stored data from one or more previous media sessions. Alternatively, SBC 2 can ascertain this by, for example, by consulting SIP Registrar 114, which may have cached connectivity data of Phone 2 when it was previously registered.

In embodiments, if it is determined that Phone 2 is capable of submitting at least a first and second network address associated with Phone 2, which are capable of being used for the transfer of media data in the media session, then SBC 2 alters the default network address in the SDP data of the SIP INVITE message of step 5d to refer to a network address associated with Phone 1, i.e. a network address associated with Phone 1 is given as an address for transmittal of media data during the media session. The alternative candidate network addresses are not altered by SBC 2.

In embodiments, SBC 2 re-writes the default network address in the SIP INVITE message with one of the alternative candidate network addresses found in the SIP INVITE message. SBC 2 can use the same basis for selecting the address as was used by Phone 1 in selecting the original default candidate. In embodiments, a relayed address is selected in preference to a server reflexive address, and a server reflexive address is selected in preference to the host address.

In an embodiment of the disclosure, the address for Phone 1 used to re-write the default network address is stored locally at SBC 2. In a further embodiment of the disclosure, the address for Phone 1 used to re-write the default network address is retrieved from a separate network entity, for example SIP Registrar 114.

In embodiments, Phone 2 determines if the default network address in the SDP data of the SIP INVITE matches any of the alternative network addresses in the SDP data of the SIP INVITE in accordance with RFC5245. In this example, the default network address is a network address associated with Phone 1, and the alternative network addresses are also network addresses associated with Phone 1. If the default network address matches an alternative network address, ICE functionality can be used for the media session.

In response to receiving a SIP INVITE message, Phone 2 gathers its candidate network addresses, assigns a priority to the candidate network addresses, and selects a default network address from the candidate network addresses using similar techniques as those employed by Phone 1, and as described above in steps A6, A7, A8 and A9 in relation to FIG. 3.

The candidate network addresses gathered in steps A1 and A6 may be specific to the media session.

The candidate network addresses are encoded in an answer message in the form of SDP data of a SIP 200 OK signaling message response. The response is made up of multiple fields; the default network address is presented in a first standard field of the response, and the candidate network addresses, referred to as alternative network addresses are presented in a second field of the response.

Phone 2 responds to the SIP INVITE of step 6d offering communication with Phone 1 with a valid answer message in the form of a response signaling message transmitted to SBC 2 in step 5e. The response message of step 5e contains SDP data for Phone 2, i.e. a default network address associated with Phone 2 is given as an address for transmittal of media data during the media session, along with alternative network addresses for Phone 2 that can also be used for transmittal of media data during the media session.

In step 5e, SBC 2 receives an inbound answer message from Phone 2 including a network address associated with Phone 2 which is capable of being used for the transfer of media data in the media session, the inbound answer message being received along an inbound answer signaling path to SBC 2.

SBC 2 determines that Phone 2 supports media bypass functionality. This may be based on the results of the previous determination carried out by the SBC2, or alternatively, another determination can be made. If another determination is made, then it can be based on the presence in the response message of a plurality of network addresses associated with Phone 2 which are capable of being used for the transfer of media data in the media session.

In response to SBC 2 determining that Phone 2 supports media bypass functionality, SBC 2 transmits in step 5*f* an outbound answer message to SIP Registrar 114 without re-writing the default network address or any of the alternative network addresses in the SDP data.

SIP registrar 114 forwards the response message of step 5*f* on to SBC 1 in step 5*f*. SIP registrar 114 does not alter the SDP data.

SBC 1 determines that Phone 2 supports media bypass functionality; this determination may for example be based on the results of the previous determination(s) carried out by the SBC2, or alternatively, another determination can be made. In embodiments where another determination is made, then it can be based on the presence in the inbound answer message of a plurality of addresses associated with Phone 2 which are capable of being used for the transfer of media data in the media session.

In response to SBC 1 determining that Phone 2 supports media bypass functionality, it transmits an outbound answer message to Phone 1 in step 5*h* without re-writing the default network address or any of the alternative network addresses in the SDP data.

Phone 1 determines if the default network address in the SDP data of the response matches any of the alternative network addresses found in the candidate lines of the response message in accordance with RFC5245. In this case, the default network address is a network address associated with Phone 2, and the alternative network addresses are alternative network addresses associated with Phone 2.

If the default network address matches an alternative network address, ICE functionality can be used for the media session.

Phone 1 and Phone 2 perform the verification and coordination procedures as described in steps A11 and A12.

Once both Phone 1 and Phone have agreed upon the candidate pair of network addresses for use, the media session can be established. The media session may include a voice call.

Media data then flows between Phone 1 and Phone 2 bypassing SBC 1 and SBC 2, i.e. media data flowing from Phone 1 is transmitted to Phone 2. Similarly, media data flowing from Phone 2 is transmitted to Phone 1 bypassing SBC 2 and SBC 1.

In these embodiments of the disclosure, the signaling path for the media session includes Phone 1, SBC 1, SBC 2 and Phone 2. However, the media path for the media session includes Phone 1 and Phone 2, but not SBC 1 or SBC 2.

Transfer of other signaling messages (not shown), such as SIP Ack messages may be transmitted between Phone 1, SBC 1, SIP registrar 114, SBC 2, and Phone 2 before media data begins to flow during the media session.

In embodiments where an offer message is directed on by one or more SBCs in the signaling path for the media session in order to reach a terminating endpoint device (Phone 2), the first SBC (SBC 1) will re-write the default network address in the first field of the SDP data so that its address is set up in the first field of the SDP data as an address to which media data for the media session is to be transmitted. The second SBC (SBC 2) will re-write the default network address in the first field of the SDP data with an originating endpoint (Phone 1) address to which media data for the media session is to be transmitted. In the answer message, neither the first SBC (SBC 1), nor the second SBC (SBC 2) will re-write the default terminating endpoint device address in the first field of the SDP.

Accordingly, the originating endpoint device (Phone 1) will transmit its media data to the terminating endpoint device (Phone 2) and the terminating endpoint device (Phone 2) will transmit its media data to the originating endpoint device (Phone 1) without the media data having to pass via the first SBC (SBC 1) or the second SBC (SBC 2). The transmission of media data from Phone 1 to Phone 2, without passing via SBC 1 or SBC 2 reduces the number of entities in the media path, and hence the demand on network resources, lower latency etc.

Figure 6:
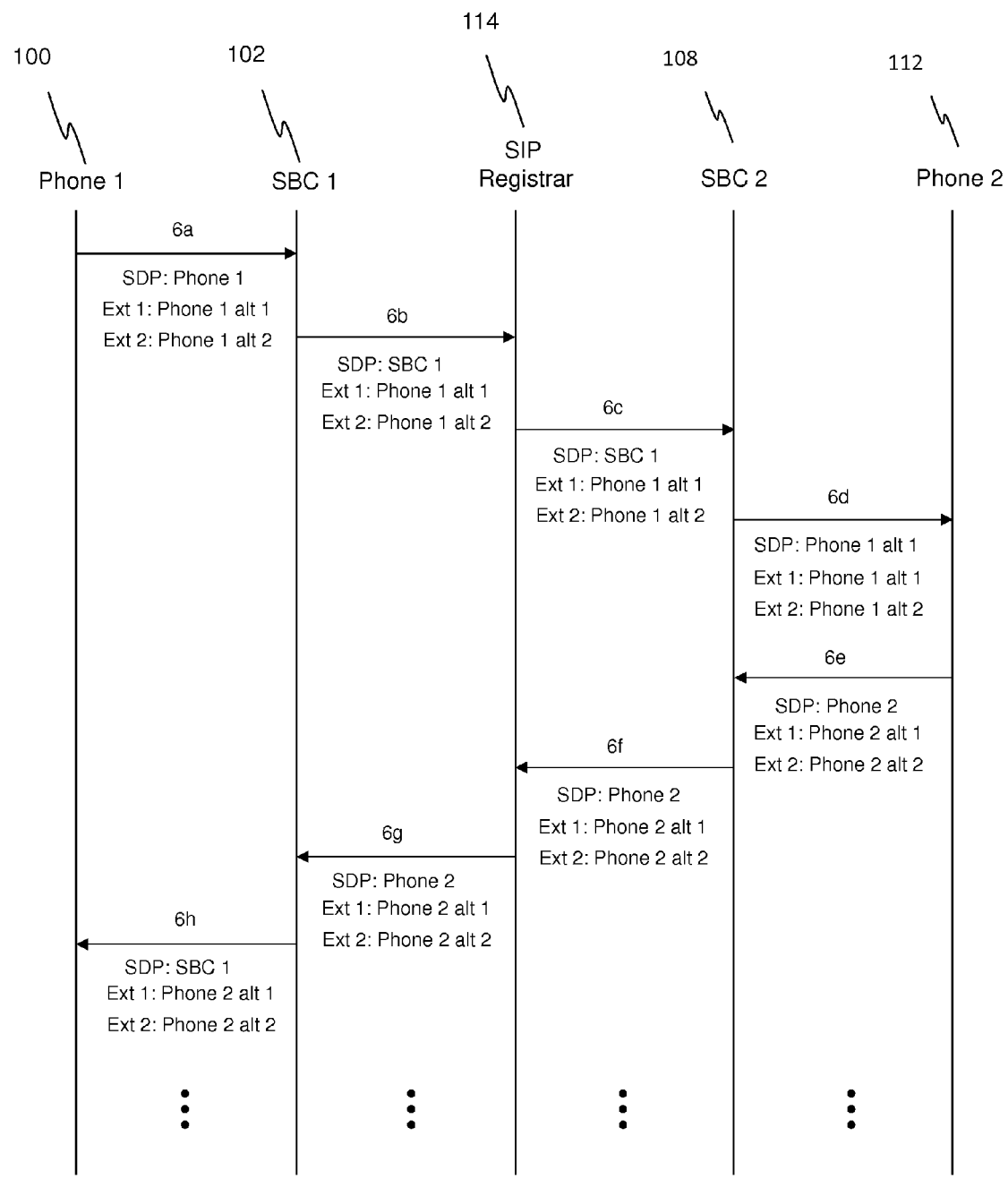
FIG. 6 is a message flow diagram depicting control of a media session according to one or more embodiments of the present disclosure.

FIG. 6 is a message flow diagram depicting control of a media session according to embodiments of the disclosure, in which Phone 1 and Phone 2 are capable of using ICE functionality. The embodiments of FIG. 6 can be implemented in a system as depicted in FIG. 1.

In this example, in the answer message, SBC 1 chooses not to allow the answer message to pass through the SBC without re-writing the default network address in the SDP data with an address for SBC 1.

Steps 6*a* to 6*g* are similar to steps 5*a* to 5*g* respectively, as described above in relation to FIG. 5. However, SBC 1 alters the SDP data for the response message of step 6*g* to refer to an address associated with SBC 1, i.e. an address associated with SBC 1 is given as an address for transmittal of media data during the media session.

The answer message is transmitted to Phone 1 in step 6*h* in the form of a SIP 200 OK message. The answer message contains an address for SBC 1 in the default network address as well as alternative network addresses for Phone 2 in the SDP data.

As the default network address of the incoming message to Phone 1 does not match any of the alternative network addresses, ICE functionality cannot be used for this media session. In this example, a media session is not established as the offer and response messages failed to establish a media path between Phone 1 to Phone 2.

Figure 7:
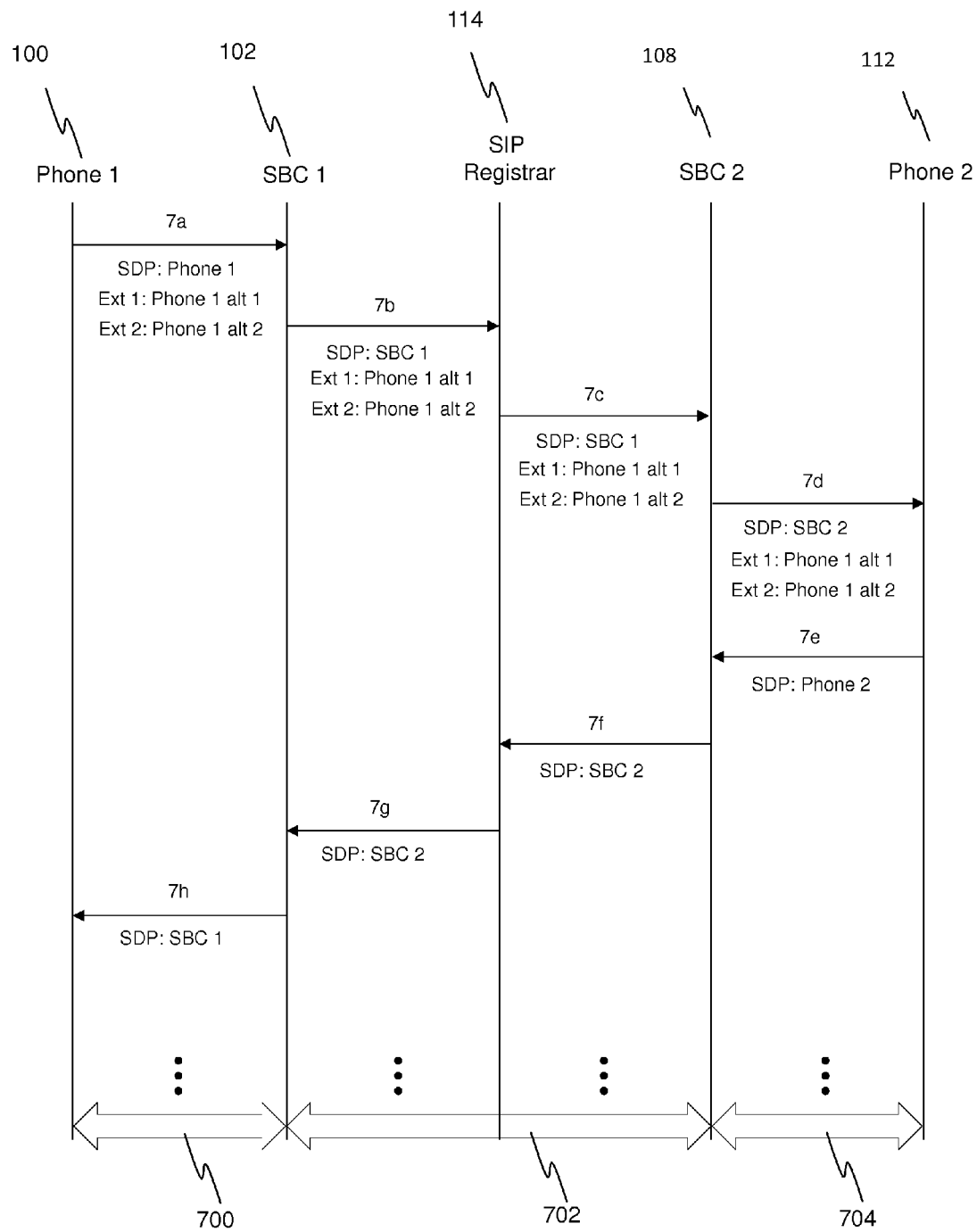
FIG. 7 is a message flow diagram depicting control of a media session according to one or more embodiments of the present disclosure.

FIG. 7 is a message flow diagram depicting control of a media session according to embodiments of the disclosure, in which Phone 1 is capable of using ICE functionality, but Phone 2 is not. The embodiments of FIG. 6 can for example be implemented in a system as depicted in FIG. 1.

Steps 7*a* to 7*c* are similar to steps 4*a* to 4*c* respectively as described above in relation to FIG. 4.

In the embodiments of FIG. 7, SBC 2 determines that Phone 2 is not capable of (or 'does not support') bypassing SBCs for the media session, and in response to this determination, alters the SDP data for the INVITE of step 7*c* to refer to a network address associated with SBC 2, i.e. an address associated with SBC 2 is given as an address for transmittal of media data during the media session. Steps 7*e* to 7*h* are similar to steps 2*e* to 2*h* respectively as described above in relation to FIG. 2.

Media data then flows between Phone 1 and Phone 2 passing via both SBC 1 and SBC 2, i.e. media data flowing from Phone 1 is relayed first via SBC 1 and then via SBC 2 and on to Phone 2. Similarly, media data flowing from Phone 2 is relayed first via SBC 2 and then via SBC 1 and on to Phone 1.

In this example, the signaling path for the media session includes Phone 1, SBC 1, SBC 2 and Phone 2. The media path for the media session also includes Phone 1, SBC 1, SBC 2 and Phone 2.

Figure 8:
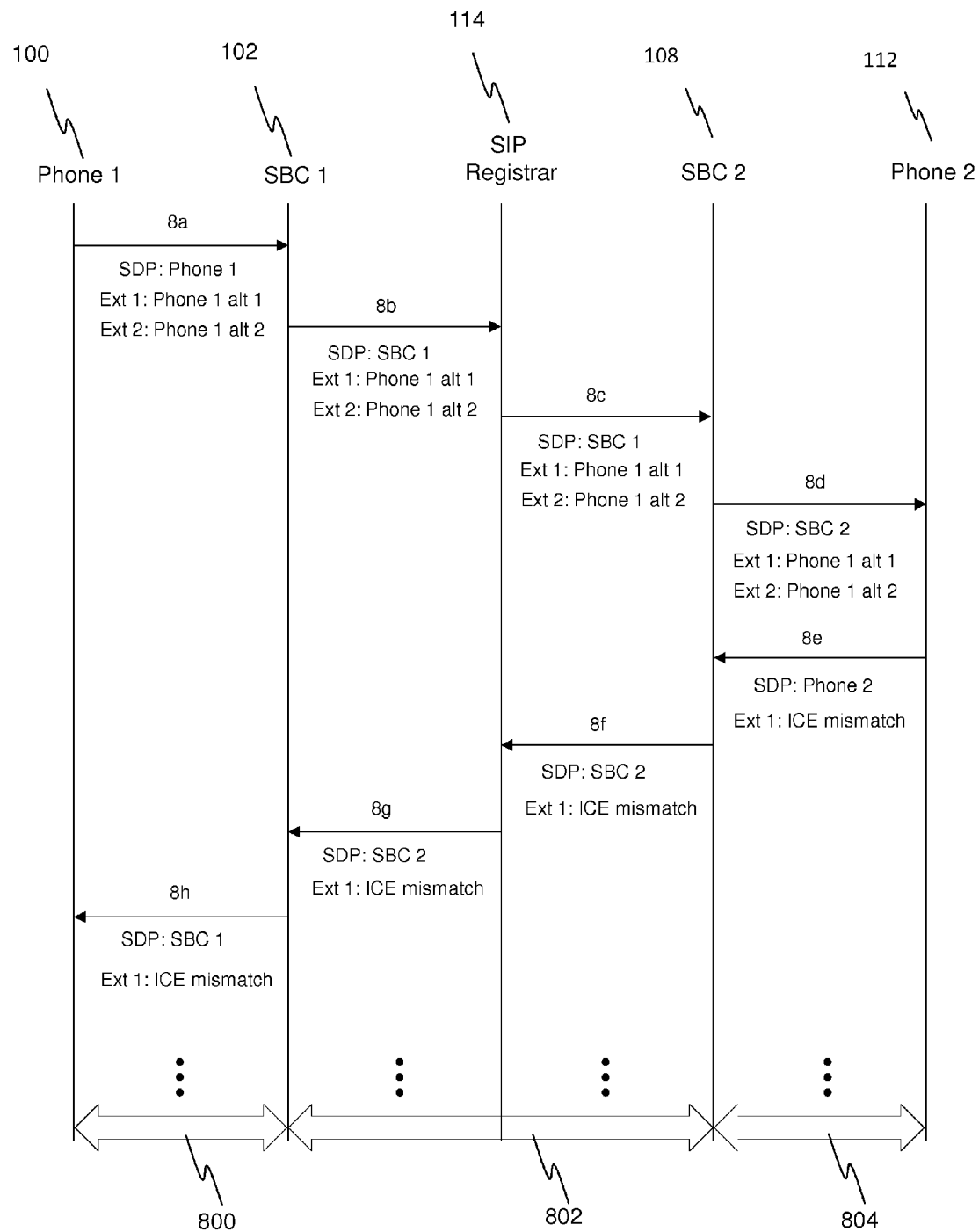
FIG. 8 is a message flow diagram depicting control of a media session according to one or more embodiments of the present disclosure.

FIG. 8 is a message flow diagram depicting control of a media session according to embodiments of the disclosure, in which Phone 1 and Phone 2 are capable of using ICE functionality. The embodiments of FIG. 8 can be implemented in a system as depicted in FIG. 1.

In the embodiments of FIG. 8, SBC 2 chooses not to re-write the default network address in the SDP data with a network address associated with Phone 1, but rather follows typical SBC behavior and alters the default network address in the SDP to refer to a network address associated with SBC 2.

As a result of SBC 2 following typical SBC behavior, steps 8a to 8h are similar to steps 4a to 4h respectively as described above in relation to FIG. 4.

Media data then flows between Phone 1 and Phone 2 passing via both SBC 1 and SBC 2, i.e. media data flowing from Phone 1 is relayed first via SBC 1 and then via SBC 2 and on to Phone 2. Similarly, media data flowing from Phone 2 is relayed first via SBC 2 and then via SBC 1 and on to Phone 1.

In embodiments of FIG. 8, the signaling path for the media session includes Phone 1, SBC 1, SBC 2 and Phone 2. The media path for the media session also includes Phone 1, SBC 1, SBC 2 and Phone 2.

Figure 9:
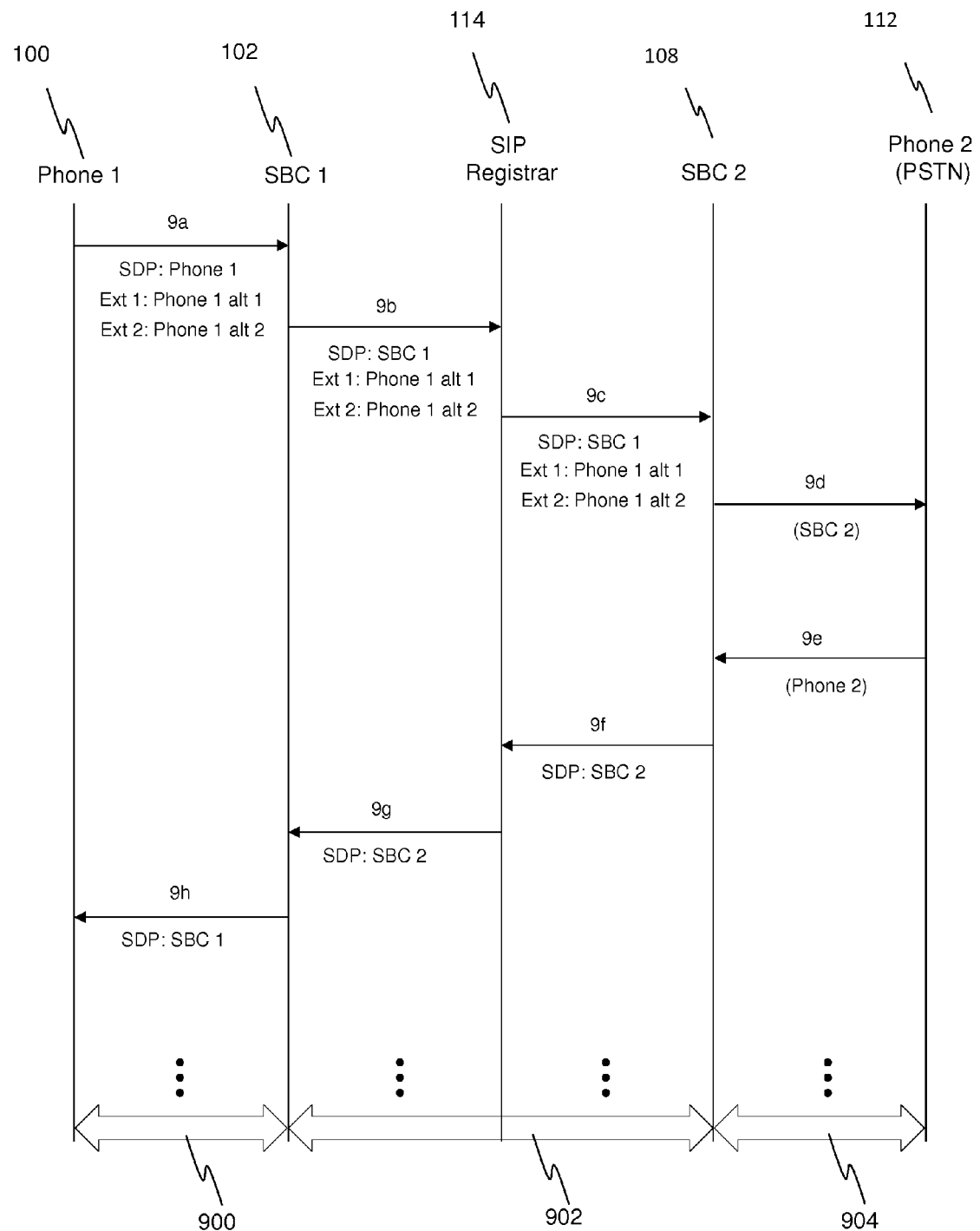
FIG. 9 is a message flow diagram depicting control of a media session according to one or more embodiments of the present disclosure.

In an embodiment of the disclosure, an offer from Phone 1 may be transmitted to another SIP device, a PSTN phone, or a phone on a mobile network such as a 2G, 3G, 4G or 5G network. FIG. 9 is a message flow diagram depicting control of a media session between a SIP endpoint and a PSTN endpoint according to embodiments of the present disclosure.

Steps 9a, 9b and 9c are similar to steps 5a, 5b and 5c respectively as described above in relation to FIG. 5. However, as the terminating endpoint is a PSTN phone, the SIP registrar 114 transmits the offer to SBC 2, which in this case is a SIP-PSTN gateway which converts signaling information for the media session between IP-based signaling used between SBC2 and Phone 1 and non-IP-based IP signaling (i.e. PSTN-compliant signaling) used between SBC2 and Phone 2. The International Telecommunications Union standards for telecommunications (ITU-T) body specifies the Signaling System #7 (SS7) protocol which may for example be employed between SBC2 and Phone 2, whilst a sub-protocol of SS7 called Integrated Services Digital Network User Part (ISUP) may also be employed which defines procedures used for transfer of call setup and teardown signaling information. SBC 2 transmits an offer message to Phone 2 according to a PSTN-compliant signaling protocol in step 9d; the offer message of step 9d may include a network address associated with SBC 2. In response to the receipt of the signaling message of step 9d at Phone 2, Phone 2 transmits an answer message according to a PSTN-compliant signaling protocol to SBC 2 in step 9e. Since inclusion of a network address is optional in steps 9d and 9e, the SBC2 and Phone 2 addresses are shown for these steps in brackets in FIG. 9.

SBC 2 transmits a response message in the form of a SIP 200 OK message on to SIP registrar 114 in the form of a SIP 200 OK message in step 9f. The SDP data for the 200 OK message of step 9f refers to an address associated with SBC 2, i.e. an address associated with SBC 2 is given as an address for transmittal of media data during the media session.

SIP registrar 114 forwards the response message of step 9f on to SBC 1 in the form of a SIP 200 OK message in step 9g. SIP registrar 114 does not alter the SDP data.

SBC 1 forwards the response message of step 9g on to Phone 1 in the form of a SIP 200 OK message in step 9h. SBC 1 alters the SDP data for the 200 OK message of step 9h to refer to an address associated with SBC 1, i.e. an address associated with SBC 1 is given as an address for transmittal of media data during the media session.

Media data then flows between Phone 1 and Phone 2 passing via both SBC 1 and SBC 2, i.e. media data flowing from Phone 1 is relayed first via SBC 1 and then via SBC 2 and on to Phone 2. Similarly, media data flowing from Phone 2 is relayed first via SBC 2 and then via SBC 1 and on to Phone 1.

In this example of prior art, the signaling path for the media session includes Phone 1, SBC 1, SBC 2 and Phone 2. The media path for the media session also includes Phone 1, SBC 1, SBC 2 and Phone 2.

Transfer of other signaling messages (not shown), such as SIP Acknowledge messages may be transmitted between Phone 1, SBC 1, SIP registrar 114, SBC 2, and Phone 2 before media data begins to flow during the media session.

In embodiments of FIG. 9, where an offer message is directed on by one or more SBCs in the signaling path for the media session in order to reach a terminating endpoint device, each SBC will re-write the SDP data so that its address is set up in the SDP as an address to which media data for the media session is to be transmitted. Accordingly, the terminating endpoint device will transmit its media data to the last SBC in the signaling path, which will send the media data through the chain of SBCs in the signaling path until finally the last SBC in the signaling path relays the media data to the originating endpoint device.

FIGS. 10A-10D depict several media bypass data stacks according to embodiments of FIG. 5 of the present disclosure.

FIG. 10A is a representation of the addresses encoded in the SDP data of a SIP INVITE generated by an originating endpoint. In this example, the originating endpoint gathers three candidate network addresses that are capable of being used in the media session for the transfer of media data and adds them in a-lines of the SDP data. One of the candidate network addresses is a host address, one is a server reflexive address, and the other is a relayed address. The originating endpoint assigns a priority to the addresses and selects a default network address from the gathered candidate network addresses to go in the c-line/m-line of the SDP. In this example, a relayed address associated with Phone 1 has been selected as the default network address. The offer message is transmitted from Phone 1 to SBC 1 containing these addresses.

FIG. 10B is a representation of the addresses encoded in the SDP data following transmission of an offer message from SBC 1. SBC 1 has re-written the default network address in the SDP data with a local network address of SBC 1. The alternative network addresses have not been altered.

FIG. 10C is a representation of the addresses encoded in the SDP data following transmission of the offer message from SBC 2. SBC 2 has re-written the default network address in the SDP data with an address associated with Phone 1. In this example, the relayed address associated with Phone 1 is selected to overwrite the default network address. In an embodiment of the disclosure, the address used to re-write the default network address is selected from one of the alternative network addresses in the offer message. In another embodiment, the address used to overwrite the default network address is stored locally to the SBC. In another embodiment, the address used to re-write the default network address is retrieved from a separate network entity.

FIG. 10D is a representation of the addresses encoded in the SDP data of an answer message generated by a terminating endpoint. In this example, the terminating endpoint gathers three candidate network addresses that are capable of being used in the media session for the transfer of media data. One of the candidate network addresses is a host address, one is a server reflexive address, and the other is a relayed address. The terminating endpoint assigns a priority to the addresses and selects a default network address from the gathered candidate network addresses. In this example, a relayed address associated with Phone 2 has been selected as the default network address. The answer message is transmitted from Phone 2 to SBC 2 containing these addresses. In accordance with embodiments of the disclosure, SBC 2 does not re-write any of the addresses in the answer message. In a further embodiment of the disclosure, SBC 1 does not re-write any of the addresses in the answer message.

Figure 11:
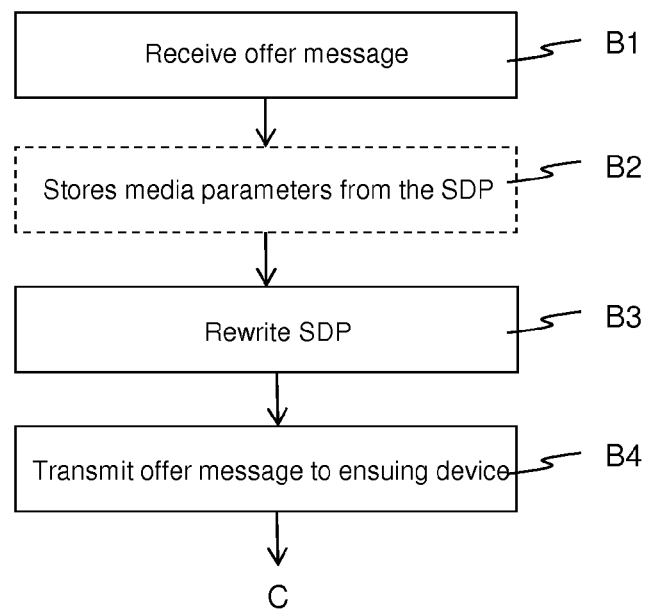
FIG. 11 is a flow chart depicting control of a media session according to one or more embodiments of the present disclosure.

FIG. 11 is a flow chart depicting control of an offer process according to embodiments of the present disclosure, i.e. steps carried out at a first SBC in the offer process carried out in a direction from the originating endpoint device to the terminating endpoint device. In particular, FIG. 11 shows some initial steps in the offer process which are carried out at a first SBC i.e. the next device located in the signaling path from the originating endpoint for the media session towards the terminating endpoint device.

In step B1, the SBC receives an offer message from an originating endpoint requesting setup of a media session between an originating endpoint device and a terminating endpoint device.

In step B2, the SBC stores media parameters from the SDP if the offer message includes one or more alternative network addresses in addition to the originating endpoint device address.

In step B3, the SBC re-writes the originating endpoint device address included in the inbound offer message with a SBC address in the outbound offer message, i.e. an address associated with the SBC is given as an address for transmittal of media data during the media session.

In step B4, the SBC transmits the offer message to the ensuing device located between the SBC and the terminating endpoint device in the signaling path.

Figure 12:
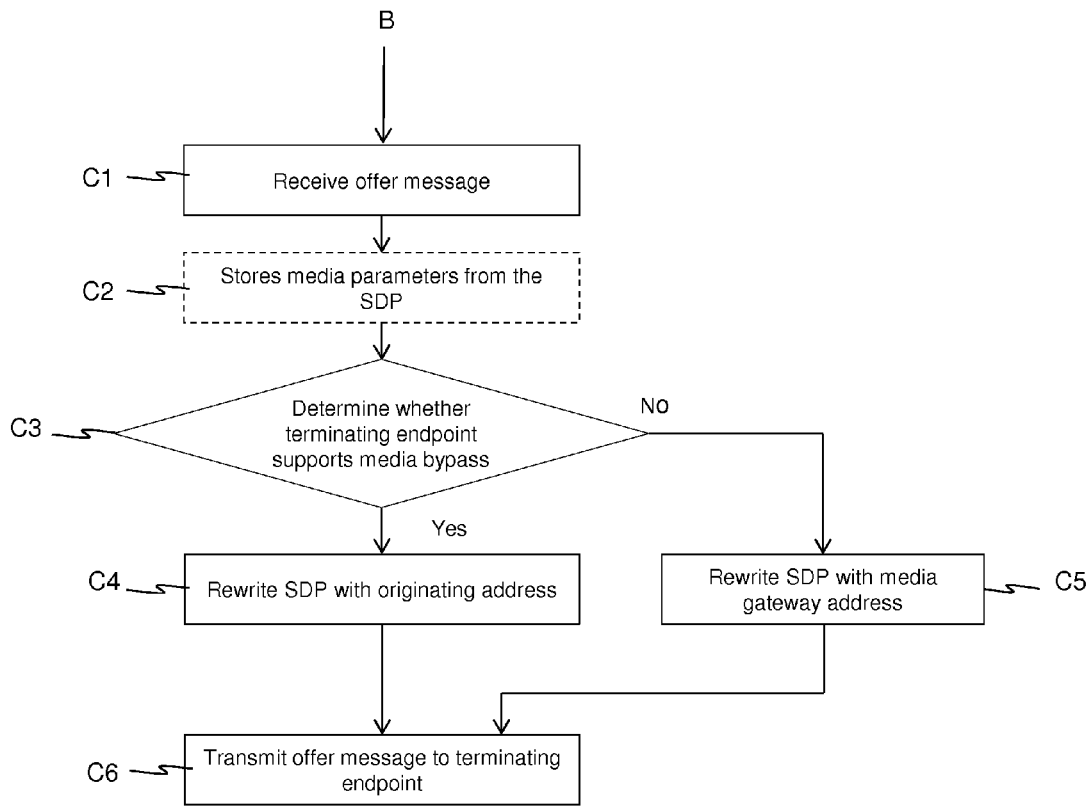
FIG. 12 is a flow chart depicting control of a media session according to one or more embodiments of the present disclosure.

FIG. 12 is a flow chart depicting control of an offer process according to embodiments of the present disclosure, i.e. steps carried out during the media session offer process carried out in a direction from the originating endpoint device to the terminating endpoint device. In particular, FIG. 12 shows some steps in the offer process which are carried out at a second SBC, i.e. the device located in the signaling path prior to the terminating endpoint device.

In step C1, the SBC receives the offer message from a preceding SBC located between the originating endpoint device and the SBC in the signaling path for the media session requesting setup of a media session between an originating endpoint device and a terminating endpoint device.

In step C2, the SBC stores media parameters from the SDP if the offer message includes one or more alternative network addresses in addition to the originating endpoint device address.

In step C3, the SBC determines whether the terminating endpoint device supports media bypass functionality where one or more SBCs can be bypassed in the media path for the media session.

In response to the terminating endpoint supporting media bypass, step C4 involves the SBC re-writing a preceding SBC address included in the inbound offer message with an originating endpoint device address in the outbound offer message.

In response to the terminating endpoint not supporting media bypass, step C5 involves the SBC re-writing a preceding SBC address included in the inbound offer message with an address of the SBC in the outbound offer message.

In step C6, the SBC transmits the offer message to the terminating endpoint.

Figure 13:
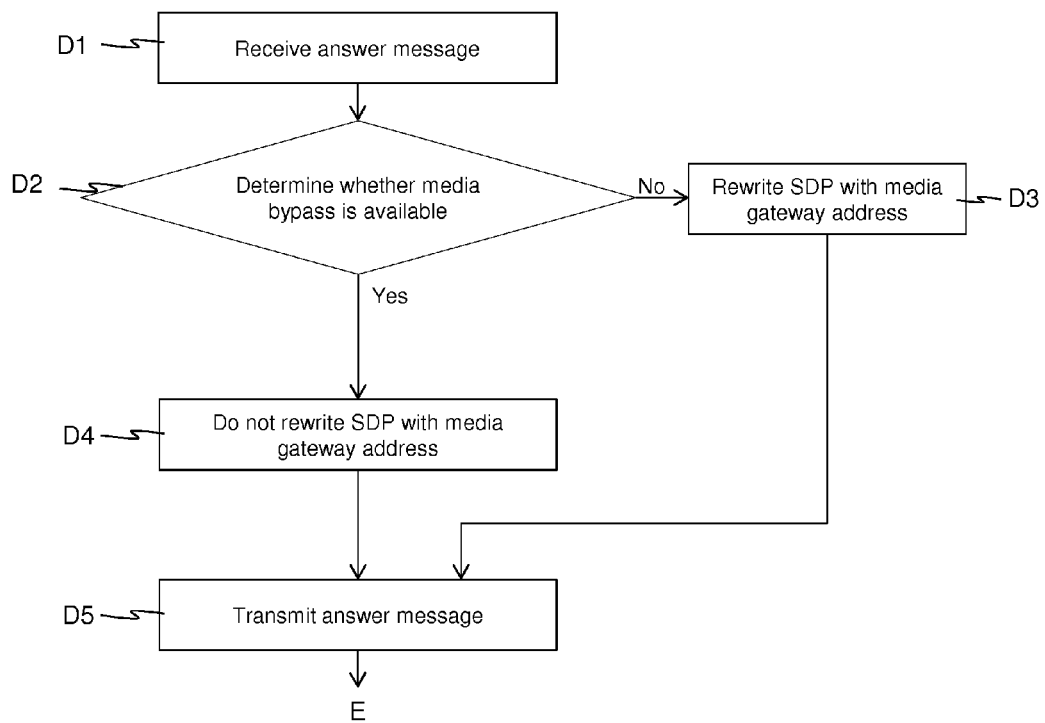
FIG. 13 is a flow chart depicting control of a media session according to one or more embodiments of the present disclosure.

FIG. 13 is a flow chart depicting control of a response process according to embodiments of the present disclosure, i.e. steps carried out during the response process in a direction from the terminating endpoint device to the originating endpoint device. In particular, FIG. 13 shows some steps in the response process which are carried out at a second SBC, i.e. the device located in the signaling path prior to the terminating endpoint device.

In step D1, the SBC receives the answer message from the terminating endpoint.

In step D2, the SBC determines whether media bypass is achievable. The SBC determines this checking that the terminating endpoint device supports media bypass functionality where one or more SBCs can be bypassed in the media path for the media session, an indication of this is that more than one candidate addresses are received in the response message.

In response to the terminating endpoint not supporting media bypass, step D3 re-writes the SDP data with an address of the SBC.

In response to the terminating endpoint supporting media bypass, step D4 does not re-write the SDP data with an address of the SBC.

In step D5, the SBC transmits the answer message to the preceding SBC.

Figure 14:
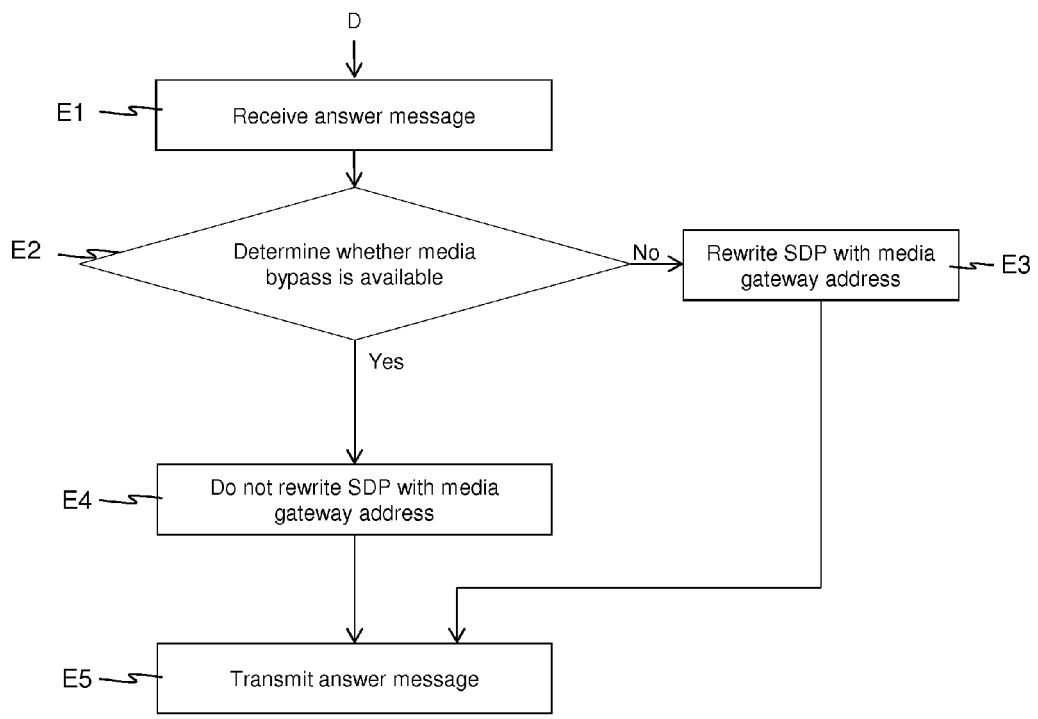
FIG. 14 is a flow chart depicting control of a media session according to one or more embodiments of the present disclosure.

FIG. 14 is a flow chart depicting control of an answer process according to embodiments of the present disclosure, i.e. steps carried out during the media session response process carried out in a direction from the terminating endpoint device to the originating endpoint device. In particular, FIG. 14 shows some steps in the answer process which are carried out at a first SBC, i.e. the device located in the signaling path after the originating endpoint device.

In step E1, the SBC receives the answer message from the ensuing SBC.

In step E2, the SBC determines whether media bypass is achievable. The SBC determines this checking that the terminating endpoint device supports media bypass functionality where one or more SBCs can be bypassed in the media path for the media session, an indication of this is that more than one candidate addresses are received in the response message.

In response to the terminating endpoint not supporting media bypass, in step E3, the SBC re-writes the SDP data with an address of the SBC.

In response to the terminating endpoint supporting media bypass, in step E4, the SBC does not re-write the SDP data with an address of the SBC.

In step E5, the SBC transmits the answer message to the originating endpoint.

The above embodiments are to be understood as illustrative examples of the disclosure. Further embodiments are envisaged.

For example, the present disclosure is described above in relation to a wireline telecommunication network. The present disclosure can also be applied to a wireless telecommunication network and/or a mixture of wireline and wireless telecommunications networks, the implementation of which will be clear to one skilled in the art in view of the foregoing disclosure.

The present disclosure is primarily described above in relation to processing of SIP signaling messages carrying the offer and answer SDP messages. Embodiments of the disclosure could include the offer and answer messages being carried in a different call setup protocol that is not SIP.

The media session may take the form of a voice call, a video call, a multimedia call, a fax, instant messaging, a file transfer or any other media or data session that can be established by SDP and ICE.

Embodiments of the disclosure described above include mention of a media address associated with a device to which media data can be transmitted. An offer or answer message may simultaneously operate on multiple media sessions. Embodiments of the disclosure could therefore involve media data being transmitted to a network address/port pair of a device, or media data being transmitted to multiple network address/port pairs on a device. Embodiments of the disclosure could include an offer message being a media session setup request and an answer message being a media session setup response.

The following numbered clauses set out various embodiments of the present disclosure:

1. A method of enabling media bypass of one or more session border controllers (SBCs) in a telecommunications network which comprises a plurality of SBCs via which a signaling path for transfer of signaling information for setup of a media session between endpoint devices can be established, the method comprising, at an SBC: receiving an inbound offer message requesting setup of a media session between an originating endpoint device and a terminating endpoint device in the telecommunications network, the inbound offer message being received along an inbound offer signaling path to the SBC; and transmitting an outbound offer message along an outbound offer signaling path from the SBC to the terminating endpoint device, wherein a preceding SBC address comprised in the inbound offer message is re-written with an originating endpoint device address in the outbound offer message, the preceding SBC address comprising a network address associated with a preceding SBC located between the originating endpoint device and the SBC in the signaling path for the media session which is capable of being used for the transfer of media data in the media session, the originating endpoint device address comprising a network address associated with the originating endpoint device which is capable of being used for the transfer of media data in the media session.

2. A method according to clause 1, comprising determining that the terminating endpoint device supports media bypass functionality where one or more SBCs can be bypassed in the media path for the media session, wherein the re-writing is performed in response to the determination.

3. A method according to clause 2, wherein the determination comprises determining that the terminating endpoint device has at least first and second associated network addresses which are capable of being used for the transfer of media data in the media session.

4. A method according to clause 2 or 3, wherein the determination comprises determining that the terminating endpoint device supports Interactive Connectivity Establishment, ICE, media bypass functionality.

5. A method according to any of clauses 2 to 4, wherein the determination comprises consulting a network entity, separate to the SBC, to determine that the terminating endpoint device supports media bypass functionality.

6. A method according to any of clauses 2 to 4, wherein the determination comprises consulting media bypass functionality data stored locally to the SBC to determine that the terminating endpoint device supports media bypass functionality.

7. A method according to clause 6, wherein the locally stored media bypass functionality data comprises stored data from one or more previous media sessions.

8. A method according to any preceding clause, comprising: receiving an inbound answer message from the terminating endpoint device comprising a terminating endpoint device address, the terminating endpoint device address comprising a network address associated with the terminating endpoint device which is capable of being used for the transfer of media data in the media session, the inbound answer message being received along an inbound answer signaling path to the SBC; and in response to receipt of the inbound answer message, transmitting an outbound answer message to the preceding SBC without re-writing the terminating endpoint device address, the outbound answer message being transmitted along an outbound answer signaling path to the preceding SBC, whereby the SBC and the preceding SBC media can be bypassed in the media path for the media session.

9. A method according to clauses 2 and 8, wherein the SBC does not re-write the terminating endpoint device address in the outbound answer message in response to the determination that the terminating endpoint device supports media bypass functionality.

10. A method according to any preceding clause, wherein in addition to the preceding SBC address comprised in the inbound offer message, the inbound offer message comprises one or more alternative network addresses associated with the originating endpoint device which are capable of being used for the transfer of media data in the media session, and wherein the originating endpoint device address comprises one of the one or more alternative network addresses.

11. A method according to clause 10, comprising selecting the originating endpoint device address from the one or more alternative network addresses for re-writing the preceding SBC address on the basis of the originating endpoint device address being preferred for the transfer of media data in the media session compared to other of the one or more alternative network addresses.

12. A method according to clause 10 or 11, wherein one of the alternative network addresses comprised in the offer message comprises a relayed address associated with the originating endpoint device provided by a TURN server.

13. A method according to any of clauses 10 to 12, wherein one of the alternative network addresses comprised in the offer message comprises a reflexive address associated with the originating endpoint device provided by a STUN server.

14. A method according to any of clauses 10 to 13, wherein one of the alternative network addresses comprised in the offer message comprises a host address associated with the originating endpoint device.

15. A method according to clauses 11 to 14, wherein the relayed address is selected in preference to the reflexive address and the host address.

16. A method according to clauses 11 to 14, wherein the reflexive address is selected in preference to the host address.

17. A method according any preceding clause, wherein the originating endpoint device address comprises a network address associated with the originating endpoint device which is specific to the media session.

18. A method according to any of clauses 8 to 17, wherein the inbound and outbound answer messages comprise a plurality of terminating endpoint device addresses comprising network addresses associated with the terminating endpoint device which are capable of being used for the transfer of media data in the media session.

19. A method according to any preceding clause, wherein the inbound and outbound offer messages are configured according to a standard, wherein the standard comprises: a first standard field, which is specified in the standard, the contents of which are specified as including an address as an offered address for transfer of media data during the media session; and a second standard field, which is specified in said standard the contents of which are specified s including an address as an offered alternative address for transfer of media data during the media session.

20. A method according to clause 19, wherein in the inbound offer message, the preceding SBC address is comprised in the first standard field and the originating endpoint address is comprised in the second standard field.

21. A method according to clause 19 or 20, wherein in the outbound offer message the originating endpoint device address is comprised in the first standard field.

22. A method according to clause 18 and any of clauses 19 to 21, wherein the inbound and outbound answer messages are configured according to the standard, wherein in the inbound and outbound answer messages the terminating endpoint device address is comprised in the first and second standard fields and one or more further terminating endpoint device addresses comprising network addresses associated with the terminating endpoint device which are capable of being used for the transfer of media data in the media session are comprised in the second standard field.

23. A method according to clause 18 and any of clauses 19 to 22, wherein one of the alternative network addresses comprised in one or more of the inbound and outbound answer messages comprises a relayed address associated with the terminating endpoint device provided by a TURN server.

24. A method according to clause 18 and any of clauses 19 to 23, wherein one of the alternative network addresses comprised in one or more of the inbound and outbound answer messages comprises a reflexive address associated with the terminating endpoint device provided by a STUN server.

25. A method according to clause 18 and any of clauses 19 to 24, wherein one of the alternative network addresses comprised in one or more of the inbound and outbound answer messages comprises a host address associated with the terminating endpoint device.

26. A method according to any preceding clause, wherein the inbound and outbound offer messages comprise Session Initiation Protocol, SIP, messages.

27. A method according to any preceding clause, wherein the inbound and outbound answer messages comprise Session Initiation Protocol, SIP, messages.

28. A method according to any preceding clause, wherein the SBC address and the originating endpoint device address are comprised in Interactive Connectivity Establishment, ICE, fields of the inbound offer message.

29. A method according to any of clauses 22 to 28, wherein the terminating endpoint device address and the one or more further terminating endpoint device addresses are comprised in Interactive Connectivity Establishment, ICE, fields of one or more of the inbound and outbound answer messages.

30. A method according to any preceding clause, wherein the media session comprises one or more of a voice call, a video call, a multimedia call, a fax, instant messaging and a file transfer.

31. A method according any preceding clause, wherein the media session comprises one or more of a SIP-PSTN voice call and a SIP-mobile network voice call.

32. A method according to any preceding clause, wherein one or more of: the network address associated with the originating endpoint, the one or more alternative network addresses associated with the originating endpoint, the network address associated with the terminating endpoint device, the at least first and second associated network addresses associated with the terminating endpoint device, the one or more further terminating endpoint device addresses, the network address associated with an SBC, the network address associated with a preceding SBC, and the network address associated with an ensuing SBC, comprises one or more of an internet layer address and a transport layer address.

33. Apparatus for use in enabling media bypass of one or more session border controllers (SBCs) in a telecommunications network which comprises a plurality of SBCs via which a signaling path for transfer of signaling information for setup of a media session between endpoint devices can be established, the apparatus comprising at least one processor, and at least one memory including computer program code, the at least one memory and the computer program code being configured to, with the at least one processor, cause an SBC to: receive an inbound offer message requesting setup of a media session between an originating endpoint device and a terminating endpoint device in the telecommunications network, the inbound offer message being received along an inbound offer signaling path to the SBC; and transmit an outbound offer message along an outbound offer signaling path from the SBC to the terminating endpoint device, wherein a preceding SBC address comprised in the inbound offer message is re-written with an originating endpoint device address in the outbound offer message, the preceding SBC address comprising a network address associated with a preceding SBC located between the originating endpoint device and the SBC in the signaling path for the media session which is capable of being used for the transfer of media data in the media session, the originating endpoint device address comprising a network address associated with the originating endpoint device which is capable of being used for the transfer of media data in the media session.

34. A computer program product comprising a non-transitory computer-readable storage medium having computer readable instructions stored thereon, the computer readable instructions being executable by a computerized device to cause the computerized device to perform the method of any of clauses 1 to 32.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method of enabling media bypass of one or more session border controllers (SBCs) in a telecommunications network which comprises a plurality of SBCs via which a signalling path for transfer of signalling information for setup of a media session between endpoint devices can be established, the method comprising, at a SBC:

receiving an inbound offer message requesting setup of a media session between an originating endpoint device and a terminating endpoint device in the telecommunications network, the inbound offer message being received along an inbound offer signaling path to the SBC;

transmitting an outbound offer message along an outbound offer signaling path from the SBC to an ensuing SBC located between the SBC and the terminating endpoint device in the signaling path for the media session, wherein the originating endpoint device address comprised in the inbound offer message is re-written with an SBC address in the outbound offer message, the SBC address comprising a network address associated with the SBC which is capable of being used for the transfer of media data in the media session, the originating endpoint device address comprising a network address associated with the originating endpoint device which is capable of being used for the transfer of media data in the media session;

receiving an inbound answer message along an inbound answer signaling path, the answer message comprising a terminating endpoint device address, the terminating endpoint device address comprising a network address associated with the terminating endpoint device and which is capable of being used for the transfer of media data in the media session; and in response to receipt of the inbound answer message, transmitting an outbound answer message to the originating endpoint device without re-writing the terminating endpoint device address, the outbound answer message being transmitted along an outbound answer signaling path to the originating endpoint device;

whereby the SBC and the ensuing SBC are bypassed in the media path for the media session, wherein in addition to the originating endpoint device address comprised in the inbound offer message, the inbound offer message comprises one or more alternative network addresses associated with the originating endpoint device which are capable of being used for the transfer of media data in the media session, wherein the inbound and outbound offer messages comprise Session Initiation Protocol, SIP, messages, and wherein the inbound and outbound answer messages comprise Session Initiation Protocol, SIP, messages.

2. The method of claim 1, comprising determining that the terminating endpoint device supports media bypass functionality, wherein the SBC does not re-write the terminating endpoint device address in the outbound answer message in response to the determination.

3. The method of claim 2, wherein the determination comprises determining that the inbound answer message comprises a plurality of terminating endpoint device addresses comprising network addresses associated with the terminating endpoint device which are capable of being used for the transfer of media data in the media session.

4. The method of claim 2, wherein the determination comprises determining that the outbound offer message comprises a plurality of originating endpoint device addresses comprising network addresses associated with the originating endpoint device which are capable of being used for the transfer of media data in the media session.

5. The method of claim 2, wherein the determination comprises determining that the terminating endpoint device has at least a first and second associated network addresses which are capable of being used for the transfer of media data in the media session.

6. The method of claim 2, wherein the determination comprises determining that the terminating endpoint device supports Interactive Connectivity Establishment, ICE, media bypass functionality.

7. The method of claim 1, wherein the inbound and outbound offer messages are configured according to a standard, wherein the standard comprises:

a first standard field, which is specified in the standard, the contents of which are specified as including an address as an offered address for transfer of media data during the media session; and a second standard field, which is specified in said standard the contents of which are specified as including an address as an offered alternative address for transfer of media data during the media session.

8. The method of claim 7, wherein the inbound offer message is configured according to the standard, the originating endpoint device address is comprised in the first standard field and the one or more alternative network addresses are comprised in the second standard field.

9. The method of claim 7, wherein the outbound offer message is configured according to the standard and the SBC address is comprised in the first standard field.

10. The method of claim 7, wherein the inbound and outbound answer messages are configured according to the standard, the terminating endpoint device address is comprised in the first standard field and one or more terminating endpoint device addresses comprising network addresses associated with the terminating endpoint device which are capable of being used for the transfer of media data in the media session is comprised in the second field.

11. The method of claim 1, wherein the originating endpoint device address and the SBC address are comprised in Interactive Connectivity Establishment, ICE, fields of one or more of the inbound and outbound offer messages.

12. The method of claim 1, wherein the terminating endpoint device address and the one or more terminating endpoint device addresses are comprised in Interactive Connectivity Establishment, ICE, fields of one or more of the inbound and outbound answer messages.

13. The method of claim 1, wherein one or more of:
the network address associated with the originating endpoint,
the one or more alternative network addresses associated with the originating endpoint,
the network address associated with the terminating endpoint device,
the one or more further terminating endpoint device addresses,
the at least first and second associated network addresses associated with the terminating endpoint device,
the network address associated with the SBC,
the network address associated with a preceding SBC, and the network address associated with an ensuing SBC, comprises one or more of an internet layer address and a transport layer address.

14. A system for use in enabling media bypass of one or more session border controllers (SBCs) in a telecommunications network which comprises a plurality of SBCs via which setup of a media session between endpoint devices can be established, the system comprising:
   at least one processor; and
   at least one memory including computer program code, the at least one memory and the computer program code being configured to, with the at least one processor, cause a SBC to:
   receive an inbound offer message requesting setup of a media session between an originating endpoint device and a terminating endpoint device in the telecommunications network, the inbound offer message being received along an inbound offer signaling path to the SBC;
   transmit an outbound offer message along an outbound offer signaling path from the SBC to an ensuing SBC located between the SBC and the terminating endpoint device in the signaling path, wherein the originating endpoint device address comprised in the inbound offer message is re-written with a SBC address in the outbound offer message, the SBC address comprising a network address associated with the SBC and which is capable of being used for the transfer of media data in the media session, the originating endpoint device address comprising a network address associated with the originating endpoint device which is capable of being used for the transfer of media data in the media session;
   receive an inbound answer message along an inbound answer signaling path, the answer message comprising a terminating endpoint device address, the terminating endpoint device address comprising a network address associated with the terminating endpoint device and which is capable of being used for the transfer of media data in the media session; and
   in response to receipt of the inbound answer message, transmit an outbound answer message to the originating endpoint device without re-writing the terminating endpoint device address, the outbound answer message being transmitted along an outbound answer signaling path to the originating endpoint device,
   whereby the SBC and the ensuing SBC are bypassed in the media path for the media session,
   wherein in addition to the originating endpoint device address comprised in the inbound offer message, the inbound offer message comprises one or more alternative network addresses associated with the originating endpoint device which are capable of being used for the transfer of media data in the media session,
   wherein the inbound and outbound offer messages comprise Session Initiation Protocol, SIP, messages, and
   wherein the inbound and outbound answer messages comprise Session Initiation Protocol, SIP, messages.

15. A non-transitory computer-readable storage medium having computer-executable instructions stored thereon, which, when executed by a processor, cause a computerized device to perform a method of enabling media bypass of one or more session border controllers (SBCs) in a telecommunications network which comprises a plurality of SBCs via which a signalling path for transfer of signalling information for setup of a media session between endpoint devices can be established, the method comprising, at a SBC:
   receiving an inbound offer message requesting setup of a media session between an originating endpoint device and a terminating endpoint device in the telecommunications network, the inbound offer message being received along an inbound offer signaling path to the SBC;
   transmitting an outbound offer message along an outbound offer signaling path from the SBC to an ensuing SBC located between the SBC and the terminating endpoint device in the signaling path for the media session, wherein the originating endpoint device address comprised in the inbound offer message is re-written with an SBC address in the outbound offer message, the SBC address comprising a network address associated with the SBC which is capable of being used for the transfer of media data in the media session, the originating endpoint device address comprising a network address associated with the originating endpoint device which is capable of being used for the transfer of media data in the media session;
   receiving an inbound answer message along an inbound answer signaling path, the answer message comprising a terminating endpoint device address, the terminating endpoint device address comprising a network address associated with the terminating endpoint device and which is capable of being used for the transfer of media data in the media session; and
   in response to receipt of the inbound answer message, transmitting an outbound answer message to the originating endpoint device without re-writing the terminating endpoint device address, the outbound answer message being transmitted along an outbound answer signaling path to the originating endpoint device,
   whereby the SBC and the ensuing SBC are bypassed in the media path for the media session,
   wherein in addition to the originating endpoint device address comprised in the inbound offer message, the inbound offer message comprises one or more alternative network addresses associated with the originating endpoint device which are capable of being used for the transfer of media data in the media session,
   wherein the inbound and outbound offer messages comprise Session Initiation Protocol, SIP, messages, and
   wherein the inbound and outbound answer messages comprise Session Initiation Protocol, SIP, messages.

16. A method of enabling media bypass of one or more session border controllers (SBCs) in a telecommunications network which comprises a plurality of SBCs via which a signalling path for transfer of signalling information for setup of a media session between endpoint devices can be established, the method comprising, at an SBC:
   receiving an inbound offer message requesting setup of a media session between an originating endpoint device and a terminating endpoint device in the telecommunications network, the inbound offer message being received along an inbound offer signaling path to the SBC; and
   transmitting an outbound offer message along an outbound offer signaling path from the SBC to the terminating endpoint device,
   wherein a preceding SBC address comprised in the inbound offer message is rewritten with an originating endpoint device address in the outbound offer message, the preceding SBC address comprising a network address associated with a preceding SBC located between the originating endpoint device and the SBC in the signaling path for the media session which is capable of being used for the transfer of media data in the media session, the originating endpoint device address comprising a network address associated with the originating endpoint device which is capable of being used for the transfer of media data in the media session, and wherein in addition to the originating endpoint device address comprised in the inbound offer message, the inbound offer message comprises one or more alternative network addresses associated with the originating endpoint device which are capable of being used for the transfer of media data in the media session, and wherein the inbound and outbound offer messages comprise Session Initiation Protocol, SIP, messages.

17. A system for enabling media bypass of one or more session border controllers (SBCs) in a telecommunications network which comprises a plurality of SBCs via which a signalling path for transfer of signalling information for setup of a media session between endpoint devices can be established, the system comprising:

at least a first processor; and at least a first memory including first computer program code, the at least first memory and the first computer program code being configured to, with the at least first processor, cause a first SBC to:

receive an inbound offer message requesting setup of a media session between an originating endpoint device and a terminating endpoint device in the telecommunications network, the inbound offer message being received along an inbound offer signaling path to the first SBC; and transmit an outbound offer message along an outbound offer signaling path from the first SBC to a second SBC located between the first SBC and the terminating endpoint device in the signaling path, wherein the originating endpoint device address comprised in the inbound offer message is re-written with a SBC address in the outbound offer message, the SBC address comprising a network address associated with the first SBC and which is capable of being used for the transfer of media data in the media session, the originating endpoint device address comprising a network address associated with the originating endpoint device which is capable of being used for the transfer of media data in the media session, and wherein in addition to the originating endpoint device address comprised in the inbound offer message, the inbound offer message comprises one or more alternative network addresses associated with the originating endpoint device which are capable of being used for the transfer of media data in the media session;

the system comprising at least a second processor, and at least a second memory including second computer program code, the at least second memory and the second computer program code being configured to, with the at least second processor, cause a second SBC to:

receive an inbound offer message requesting setup of a media session between an originating endpoint device and a terminating endpoint device in the telecommunications network, the inbound offer message being received along an inbound offer signaling path to the second SBC; and transmit an outbound offer message along an outbound offer signaling path from the second SBC to the terminating endpoint device, wherein the first SBC address comprised in the inbound offer message is re-written with an originating endpoint device address in the outbound offer message, the first SBC address comprising a network address associated with the first SBC located between the originating endpoint device and the second SBC in the signaling path, which is capable of being used for the transfer of media data in the media session, the originating endpoint device address comprising a network address associated with the originating endpoint device which is capable of being used for the transfer of media data in the media session;

receive an inbound answer message from the terminating endpoint device comprising a terminating endpoint device address, the terminating endpoint device address comprising a network address associated with the terminating endpoint device which is capable of being used for the transfer of media data in the media session, the inbound answer message being received along an inbound answer signaling path to the second SBC; and in response to receipt of the inbound answer message, transmit an outbound answer message to the first SBC without re-writing the terminating endpoint device address, the outbound answer message being transmitted along an outbound answer signaling path to the first SBC, the at least first memory and the first computer program code being configured to, with the at least first processor, cause the first SBC to:

receive an inbound answer message along an inbound answer signaling path, the answer message comprising a terminating endpoint device address, the terminating endpoint device address comprising a network address associated with the terminating endpoint device and which is capable of being used for the transfer of media data in the media session; and in response to receipt of the inbound answer message, transmit an outbound answer message to the originating endpoint device without re-writing the terminating endpoint device address, the outbound answer message being transmitted along an outbound answer signaling path to the originating endpoint device, whereby the first SBC and the second SBC are bypassed in the media path for the media session, wherein the inbound and outbound offer messages comprise Session Initiation Protocol, SIP, messages, and wherein the inbound and outbound answer messages comprise Session Initiation Protocol, SIP, messages.

* * * * *